US011949693B2

(12) United States Patent
Thomson

(10) Patent No.: US 11,949,693 B2
(45) Date of Patent: Apr. 2, 2024

(54) USER AND GROUP SPECIFIC THREAT PROTECTION SYSTEM AND METHOD

(71) Applicant: Avast Software s.r.o., Prague (CZ)

(72) Inventor: Allan Thomson, Pleasanton, CA (US)

(73) Assignee: Avast Software s.r.o., Prague (CZ)

( * ) Notice: Subject to any disclaimer, the term of this patent is extended or adjusted under 35 U.S.C. 154(b) by 277 days.

(21) Appl. No.: 17/317,707

(22) Filed: May 11, 2021

(65) Prior Publication Data
US 2022/0368699 A1 Nov. 17, 2022

(51) Int. Cl.
*H04L 9/40* (2022.01)
(52) U.S. Cl.
CPC ........ *H04L 63/1416* (2013.01); *H04L 63/104* (2013.01)
(58) Field of Classification Search
CPC .......................... H04L 63/104; H04L 63/1416; H04L 63/0236
See application file for complete search history.

(56) References Cited

U.S. PATENT DOCUMENTS

| 9,338,176 B2 * | 5/2016 | Trumbull | H04L 63/1416 |
| 2003/0217125 A1 * | 11/2003 | Brancati | H04L 69/329 709/224 |
| 2007/0268862 A1 * | 11/2007 | Singh | H04W 76/14 370/329 |
| 2008/0163369 A1 * | 7/2008 | Chang | H04L 63/1483 726/22 |
| 2010/0205665 A1 * | 8/2010 | Komili | H04L 67/564 726/12 |
| 2014/0359707 A1 * | 12/2014 | Smithson | H04L 63/04 726/4 |
| 2014/0380480 A1 * | 12/2014 | Tang | H04L 63/1408 726/24 |
| 2015/0350253 A1 * | 12/2015 | Alderson | G06F 40/134 726/1 |
| 2016/0234249 A1 * | 8/2016 | Wong | H04L 63/101 |

(Continued)

FOREIGN PATENT DOCUMENTS

| CN | 108874802 A | 11/2018 |
| EP | 4099619 A2 | 12/2022 |
| JP | 2018163535 A | 10/2018 |

OTHER PUBLICATIONS

Partial European search report dated Oct. 11, 2022 for EP Application No. 22172625.0 which corresponds to European publication No. EP4099619-A2.

(Continued)

*Primary Examiner* — Daniel B Potratz
*Assistant Examiner* — Matthias Habtegeorgis
(74) *Attorney, Agent, or Firm* — Dovas Law, P.C.

(57) ABSTRACT

A method of managing access to a network destination. The method includes establishing a first network zone for a user, the first network zone including a plurality of network destinations. The first network zone is monitored and one or more changes in the first network zone are determined. A first network destination in the first network zone is analyzed responsive to determining the one or more changes in the first network zone to determine a first threat. An attempt by the user to access the first network destination is detected, and access by the user to the first network destination is restricted based on the determining the first threat.

36 Claims, 19 Drawing Sheets

(56) References Cited

U.S. PATENT DOCUMENTS

| | | |
|---|---|---|
| 2016/0350531 A1 | 12/2016 | Harris et al. |
| 2017/0359725 A1* | 12/2017 | Bolte .................. H04W 12/088 |
| 2018/0234396 A1* | 8/2018 | Adams .................. H04L 67/141 |
| 2019/0109864 A1 | 4/2019 | Sinan et al. |
| 2020/0092326 A1 | 3/2020 | Prakash et al. |
| 2022/0156472 A1* | 5/2022 | Jacobs .................. H04L 67/141 |
| 2022/0239625 A1* | 7/2022 | Woodberg ............ H04L 63/1483 |
| 2022/0337603 A1* | 10/2022 | Shah ..................... H04L 63/102 |
| 2022/0368689 A1* | 11/2022 | Ben-Noon ............. H04W 12/06 |

OTHER PUBLICATIONS

Extended European search report dated Mar. 23, 2023 for EP Application No. 22172625.0.

\* cited by examiner

USER AND GROUP SPECIFIC THREAT PROTECTION SYSTEM AND METHOD

FIELD OF INVENTION

The invention relates generally to threat detection in computer networks, and more particularly to providing personalized threat protection in computer networks.

BACKGROUND

Currently there are many network computing threats that a user (e.g., a consumer or business) faces from network endpoints, websites, downloads, and applications accessible for example via a browser or internet accessible application. Despite the numerous and varied computer applications and extensions available for mitigating the dangers of computing activities performed over a network, risks abound. Often a computer user is tasked with making the ultimate decision as to the safety of a particular activity, for example the trustworthiness of a particular website or content download, and often this decision is made on the basis of very limited information. To determine computing threats, computing security companies may collect content, website references, network services references, and files from websites and services in public networks and analyze the collected content, references, and files in test ("sandbox") environments in an attempt to identify how the content, references, and files act, and to identify the purpose of the content and how websites and services refer to and link to other websites and services. Further, threat intelligence companies may monitor various intelligence sources, gather multiple forms of data intelligence, and determine risk associated with gathered intelligence.

Threats can originate from internet domains or applications which use wording and content to impersonate known brands or cause confusion as to the source of products or services offered through the internet domains and applications and to facilitate distribution of harmful applications to a user's device. Online search results or paid online advertisements may include links to internet domains or applications impersonating known brands for the purpose of distributing harmful electronic content or counterfeit goods. Nefarious internet sites or applications may offer counterfeit or unauthorized goods or services or solicit login information from a user meant for a legitimate site in an attempt to steal a user's account information, credit card information, or banking information, for example to make purchases in the name of the user. Users can further be confronted with internet sites or applications which generate, promote, or publish counterfeit reviews or ratings regarding products or services, for example to encourage purchase of counterfeit goods or downloading of harmful computer applications.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of managing access to a network destination is provided. The method includes establishing a first network zone for a user, the first network zone including a plurality of network destinations. The first network zone is monitored and one or more changes in the first network zone are determined. A first network destination in the first network zone is analyzed responsive to determining the one or more changes in the first network zone to determine a first threat. An attempt by the user to access the first network destination is detected, and access by the user to the first network destination is restricted based on the determining the first threat.

Another method for managing access to a network destination is provided. In the other method a first network zone is established for a user, the first network zone including a plurality of network destinations. The first network zone is monitored. One or more changes in the first network zone are determined, and a first network destination in the first network zone is analyzed responsive to determining the one or more changes in the first network zone to determine a first threat. One or more connections from the first network destination to a second network destination are detected. A second network zone is established based on the second network destination responsive to determining the first threat, the second network zone comprising the second network destination and a plurality of other network destinations connected to the second network destination. The second network destination and the plurality of other network destinations are analyzed to determine a second threat. The second network destination and the plurality of other network destinations are monitored periodically responsive to detecting the second threat to determine a third threat. An attempt by the user to access the first network destination is detected, and access by the user to the first network destination is restricted based on the determining the third threat.

Yet another method for managing access to a network destination is provided. In the yet another method, a first network zone is established for a user, the first network zone including a plurality of network destinations. The first network zone is monitored. One or more changes in the first network zone are determined, and a first network destination in the first network zone is analyzed responsive to detecting the one or more changes in the first network zone. One or more connections from the first network destination to a second network destination are detected based on the analyzing the first network destination, and the second network destination is analyzed to determine a first threat. A second network zone is established based on the second network destination responsive to determining the first threat, the second network zone including a plurality of other network destinations connected to the second network destination. The plurality of other network destinations are periodically monitored responsive to determining the first threat to determine a second threat. An attempt by the user to access the first network destination is detected, and access by the user to the first network destination is restricted based on the determining the second threat.

A further method for managing access to a network destination is provided. In the further method, a first network zone is established for a user, the first network zone including a plurality of network destinations. The first network zone is monitored, and one or more changes in the first network zone are determined. A first network destination in the first network zone is analyzed responsive to determining the one or more changes in the first network zone to determine a first threat based on a network connection from the first network destination to a second network destination. Content of the second network destination is analyzed responsive to determining the first threat to determine a second threat. An attempt by the user to access the first network destination is detected, and access by the user to the first network destination is restricted based on the determining the second threat.

A computing system is provided including one or more hardware processors and one or more non-transitory computer-readable storage medium coupled to the one or more hardware processors and storing programming instructions for execution by the one or more hardware processors, wherein the programming instructions, when executed, cause the computing system to perform operations. The operations include establishing a first network zone for a user, the first network zone including a plurality of network destinations, monitoring the first network zone, determining one or more changes in the first network zone, and analyzing a first network destination in the first network zone responsive to determining the one or more changes in the first network zone to determine a first threat. The operations further include detecting an attempt by the user to access the first network destination, and restricting access by the user to the first network destination based on the determining the first threat.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
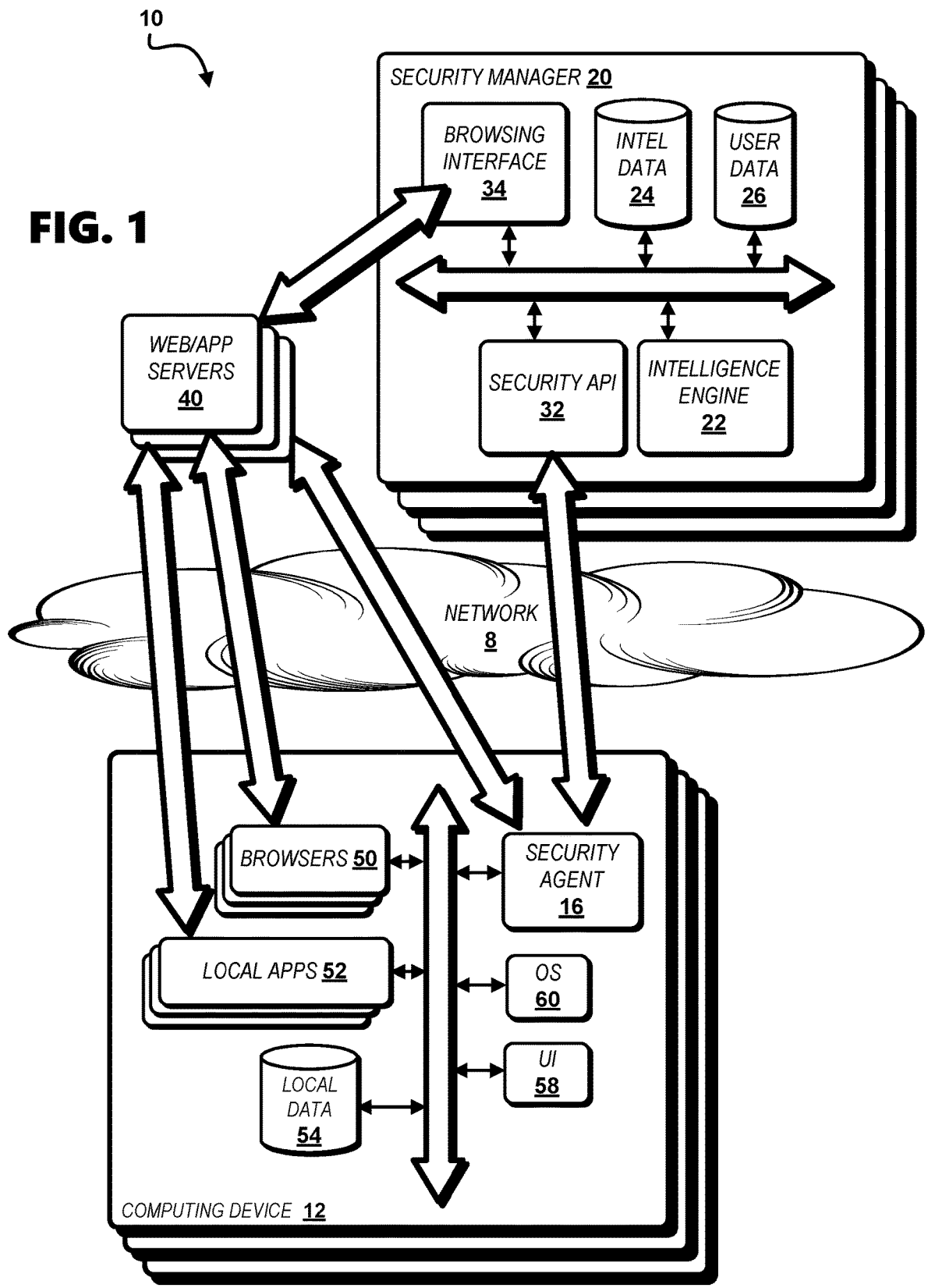
FIG. 1 shows a system for detecting and mitigating computing security threats according to illustrative embodiments.

Many personalized or business specific network computing security threats ("threats") are not detected successfully by prior art security systems due to the nature of how the threats are crafted by an adversary and the inability for the security systems to perform deeper analysis either in quick enough time or with the user's context (e.g., credentials, identifying information, and login information) available to the security systems. Many threats that a consumer or business faces may require the analysis of networks, endpoints, websites, applications and a broad set of data to enable security decisions to be made during the time in which the user (e.g., a consumer or business user) is accessing a website or universal resource locator ("URL"), downloading content, or accessing other resource via a browser or other network accessible (e.g., internet accessible) application.

Threats can be facilitated by multiple technical attack vectors. Internet domains and applications, including but not limited to domains or applications impersonating legitimate domains or enabling phishing activities, may be significant threats. Vulnerabilities and misconfigurations on a user's computing device or at a network destination visited via the user's computing device can also enable threats to the user's device by varied technical attack vectors. Social engineering attack vectors can also facilitate threats. Fake news, abuse of online product ratings, abuse of online advertising platforms, and data stolen by social engineering methods can further enable threats. Threats can originate from supply chain vulnerabilities in the design and implementation stages of software or during software deployment and update processes. Threats can include computer viruses or network destinations that host or distribute computer viruses. Threats can further include network destinations (e.g., internet websites) with inadequate or compromised security making them susceptible to computer viruses, distribution of computer viruses, or hijack or control by malicious actors, for example for the purpose of distributing computer viruses or engaging in phishing activities.

Network security protection measures can provide the benefit of real-time security threat protection without impact on endpoints (e.g., desktop computers, laptop computers, and mobile handheld computing devices). However, network security protection can be localized to a particular network location, can lack context and user identity, can have limited time for threat detection and mitigation, and can be thwarted by encryption and other network visibility issues. For example, localized network security protection implementing antivirus or inline detection is required to make decisions within milliseconds to seconds at most. Yet analyzing content on a website and determining the nature of a threat can take minutes or more.

Protection measures instituted via a browser application can provide the benefit of platform independent, full context, real-time threat protection with beneficial resistance against man-in-the-middle ("MiTM") attacks, while resulting in small impact on endpoints where the browser is executed. However, browser protection measures can suffer from insufficient computing time for deeper threat detection and mitigation. Browser protection measures are also hindered by a general user hesitancy to adopt such protection for their browser on their computing devices.

Anti-virus security protection software can provide real-time threat management with minimal impact on endpoints, and can provide encryption and context visibility. However, anti-virus security protection software still has some impact on the endpoint on which it is executed and has limited time for computation, threat detection, and threat mitigation. Anti-virus security protection can be slowed by device operating system limitations and may suffer from lesser resistance against man-in-the-middle ("MiTM") attacks, inabilities to detect threats in web environments, and inabilities to restrict URL access.

A challenge is that browsers or other network communication-enabling applications running on an endpoint (e.g., desktop computer, laptop computer, or mobile handheld computing device) as well as network security inspection devices (e.g., an intrusion prevention system ["IPS"]) have a very limited time to make decisions on whether an activity represents a security threat and whether to mitigate the security threat before a user's system becomes compromised. Computing devices have to make decisions based on the limited indicators of compromise ("IOCs"), made available from security applications, which are detectable in the context available to the browser or application processing real-time traffic. The result is that many user-personalized or business-specific threats may not be detected successfully due to the nature of how the threat is crafted by an adversary and the inability for a security application to perform deeper analysis either in quick enough time or with the user's context (e.g., credentials, identifying information, and login information) available to the security application.

To determine threats, security companies may collect content, website references, network services references, and files from websites and services in public networks. Server-side behaviors may be detected including the executing of programs rendering content on a server-side which content is then shown in a browser. The observed and collected content, references, files, and server-side behaviors are analyzed in test ("sandbox") environments in an attempt to identify how the content, references, files, and server-side behaviors act, and to identify the purpose of the content and how websites and services refer to and link to other websites and services. However, the sandbox environments do not have access to a user's credentials or the exact setup that a particular user may implement. This results in missed detections. Threat intelligence companies may monitor various intelligence sources, gather multiple forms of data intelligence, and determine risk associated with gathered intelligence. Aggregated intelligence data by itself may be of limited use and lack a personalized context or business context or viewpoint.

Described herein are systems which provide network security benefits to a user. These benefits include personalized or business-specific threat detection based on online behavior and whitelist profile of a user. Cloud-based deployment of a threat analysis system with available user identity integration is enabled, for example as a software-as-a-service ("Saas"). Integration and extension are available to perform different forms of analysis and threat detection across security, identity and privacy platforms of the user, whether a consumer or a business. The systems enable pre-attack protection based on analysis and threat detection performed to identify attacks that are likely to target a user, whether a consumer user or business user, before an attack occurs against the user. The systems enable detections while an attack is occurring and by using intelligence regarding malicious actions that are likely to occur against a user or group of users before the malicious actions occur based on usage patterns of the user or group of users. Hindrances to security threat detection including traffic encryption, restricted access to operating systems, lack of context (e.g., user credentials) are overcome. Scans can be performed continuously based on browsing in the identity of particular users for in-depth inspection permitting aggregation of threat intelligence (e.g., news) related to particular zones in a computer network.

Referring to FIG. 1, a system 10 is provided for detecting and mitigating threats facing users of computing devices 12 operating in a computer network 8. The computer network 8 includes one or more wired or wireless networks or a combination thereof, for example including a local area network (LAN), a wide area network (WAN), the internet, mobile telephone networks, and wireless data networks such as Wi-Fi™ and 3G/4G/5G cellular networks. Operating system 60 (hereinafter "OS 60") is executed on computing devices 12. The system 10 enables monitoring the browsing history and clickstream of a user on a computing device 12, providing the system 10 with an ordered sequence of hyperlinks followed by a user at one or more websites or other network destinations.

A network-connectable processor-enabled security manager 20 coupled to a computing device 12 enables threat detection and mitigation to be provided to the computing device 12 via a security agent 16. Beneficially, a security manager 20 is instanced per user of one or more computing devices 12, such that each user has their own security manager 20 assigned to them. Alternatively, the security manager 20 can be instanced per a defined group of users (e.g., a family sharing a telecommunication service plan, or a business organization). The security agent 16 is beneficially provided integral with or as an extension to one or more browser applications 50 ("browsers") and provides notices to a user via a user interface 58. The security agent 16 gathers browsing history and clickstreams from a browser 50 with which it is integrated or in communication with, which data is transmitted to the security manager 20 via a security application program interface ("API") 32. The security manager 20 provides threat information to the security agent 16 via the security API 32 for enabling the security agent 16 to filter and block network-based threats confronted by a browser 50. Further, the security agent 16 can engage with other local applications 52 for example standalone applications, plugins, add-ons, or extensions to existing applications, for example web browser plugins, to manage threats confronted by the local applications 52.

A website server or application server 40 (hereinafter "web/app server") can function to enable local applications 52 or components of a local application 52. Web/app servers 40 can further enable services including network-based applications, webpages, or other services accessible via a browser 50. The security agent 16 monitors user activity on the computing device 12 including a user's use of local and network-based applications and a user's accessing of websites and of particular content on local and network-based applications and websites, which data is fed to the security manager 20 via the security API 32. Records and statistics of such use are used by an intelligence engine 22 to build network zones corresponding to particular users or groups of users, which network zones (hereinafter "protection zones") are stored in one or both of an intelligence datastore 24 of the security manager 20 or a local datastore 54 of the computing device 12. Network destinations within the protection zones are monitored for threats. The security manager 20 can engage and monitor web/app servers 40 via a browsing interface 34 for example by accessing websites, applications, or services as a particular user of a computing device 12 using the credentials or other identifying information of the particular user, or using synthetic credentials matching a profile of a particular user or a plurality of users.

Figure 2:
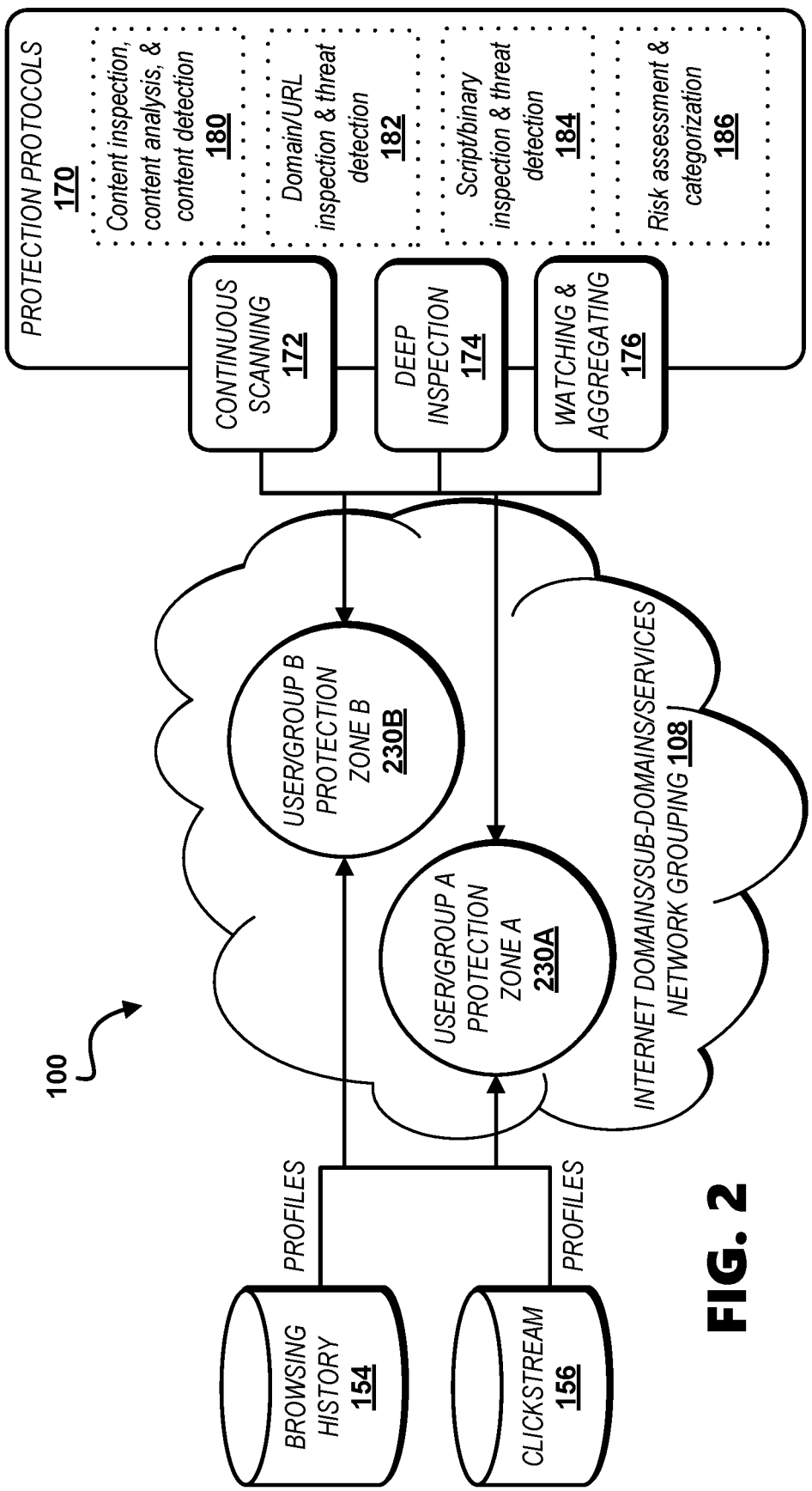
FIG. 2 is a diagram showing a process flow for generating and monitoring protection zones in a computer network.

Referring to FIG. 2, a protection zone generation and monitoring process flow 100 is shown in which the security manager 20 via the intelligence engine 22 or the security agent 16 generates protections zones within a particular grouping of internet domains, sub-domains, and services ("network grouping") 108. A first exemplary protection zone ("protection zone A") 230A corresponds to a first user or a first group of users ("user/group A"). A second exemplary protection zone ("protection zone B") 230B corresponds to a second user or a second group of users ("user/group B").

Protection zones are defined by the security manager 20 based on a policy defined by an administrator or learned from a user's use of the internet (e.g., a business user or consumer user) and can represent whitelisted parts of the internet that a user or group of users has visited or may visit in the future. A protection zone includes a collection of one or more of URLs, internet protocol ("IP") addresses, or other references to network destinations which defines an expected or known field of use corresponding to a particular user or group of users. A protection zone can be established based on identifying information of users which can include for instance one or more of user geographic location information, user business field information, user age information, or user income information. For example, a group of users employed in a particular industry (e.g., banking) can correspond to a protection zone including internet websites pertaining to the particular industry (bank sites). In another example, a child user or group of children users in a particular household who usually play online games can correspond to a protection zone including network destinations that enable internet gaming applications. In yet another example a protection zone can be established including network destinations corresponding to financial content or general news content, for example based on content interests of particular users. Protection zones expand and contract based on user network browsing behavior and changes to the sites and services which a protection zone includes or changes to sites and services linked to sites and services in a protection zone. For example, if a protection zone includes URLs of particular websites corresponding to a particular industry (e.g., gambling), and the particular websites frequently include promotional links to other websites in another industry (e.g., spirits and beverages), the protection zone can be expanded to include URLs of the other websites and related websites corresponding to the other industry.

User activity is monitored by the security agent 16 on a computing device 12, beneficially integrated with a browser 50, to acquire internet browsing history and clickstream data which is subsequently stored in one or both of the local datastore 54 or the user datastore 26. One or both of the local datastore 54 or the user datastore 26 include browsing history datastores 154 and clickstream datastores 156 which store browsing history profiles and clickstream profiles for particular users and groups of users. Browsing history profiles and clickstream profiles for particular users or groups of users are used by the security manager 20 or by the security agent 16 to generate protection zones, for example the user/group A protection zone A 230A and the user/group B protection zone B 230B.

The security manager 20 via the browsing interface 34 implements protection protocols 170 in which continuous scanning 172, deep inspection 174 and watching and aggregating 176 of sites and services enabled by web/app servers 40 are performed for each protection zone. In implementing the protection protocols 170, content inspection, content analysis, and content detection for sites and services in each protection zone is performed (process 180). Sites and services defined by a domain, sub-domain or URL in each protection zone are inspected and threats are detected (process 182). Script inspection, binary inspection and threat detection for sites and services in each protection zone is performed (process 184), and risk assessment and categorization for sites and services in each protection zone are performed (process 186).

Figure 3:
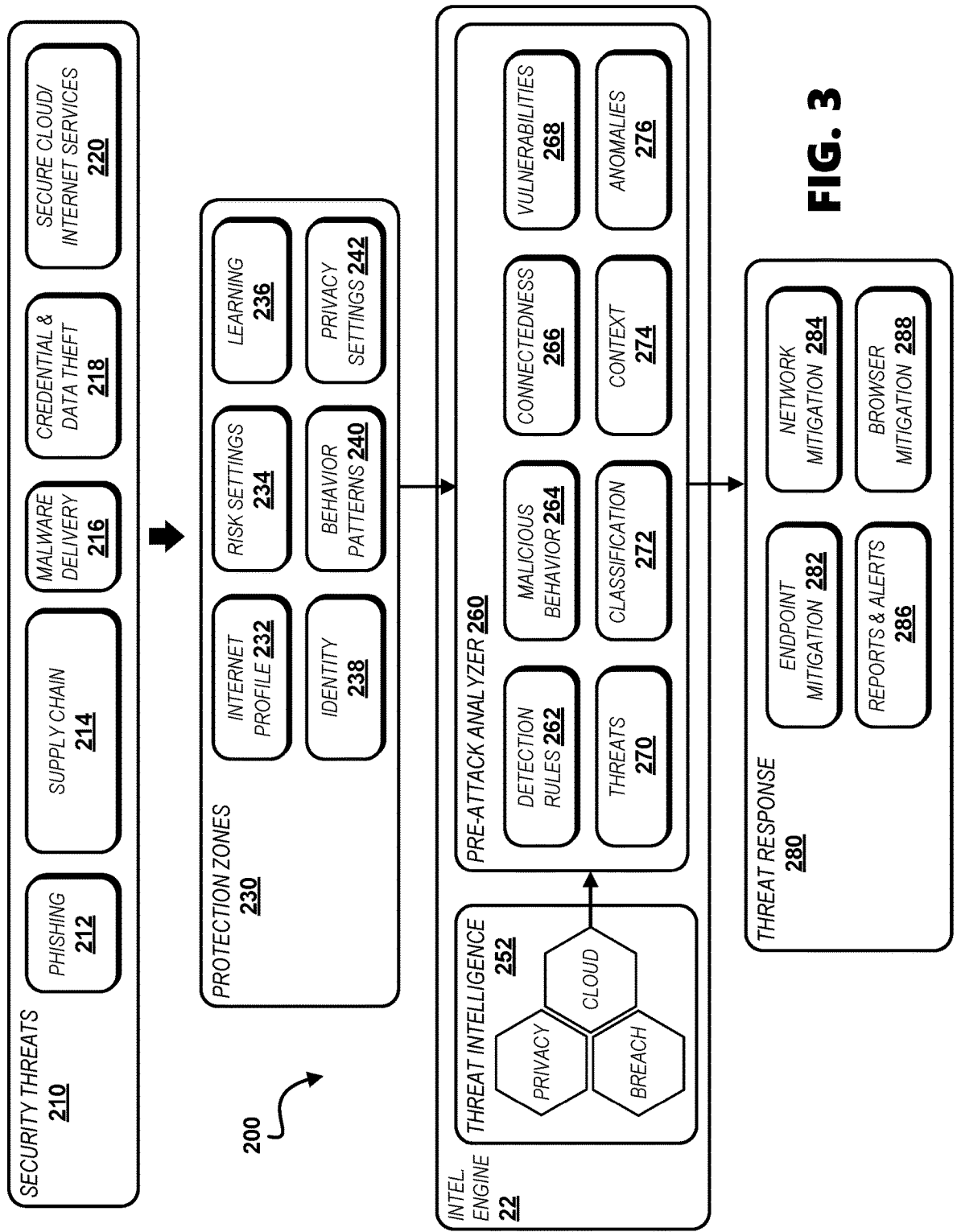
FIG. 3 is a diagram showing a process flow for detecting and mitigating security threats in a computer network.

Referring to FIG. 3, a security threat detection and mitigation process flow 200 is shown in which threats 210 detected and analyzed via protection protocols 170 are non-exclusively listed as phishing threats 212, supply chain threats 214 (e.g., fake applications, fake services, and fake sites), malware delivery threats 216, credential and data theft threats 218, secure cloud and internet services threats and vulnerabilities 220. Pre-attack protection is enabled against internet threats for example threats 210. Protection zones 230, for example user/group A protection zone A 230A and user/group B protection zone B 230B, are behavior driven based on defined and learned policies of the security agent 16 which is beneficially integrated with a browser 50. Components for generating the protection zones 230 include an internet profile 232, risk settings 234, learned information 236, identity information 238, behavior patterns 240, and privacy settings 242 of one user or a group of users implementing a browser 50 or other device or system incorporating the security agent 16.

Beneficially, the security manager 20 and the intelligence engine 22 are cloud based, and the intelligence engine 22 enables a pre-attack analyzer 260 and the processing of threat intelligence data 252 (e.g., privacy intelligence, data breach intelligence, identity intelligence, cloud network intelligence) retrieved for example from the intelligence datastore 24. The threat intelligence data 252 is beneficially based on inspection of web/app servers 40 and analysis of user activity via one or more browsers 50 on a computing device 12 or analysis of user activity on other monitored network-connected devices. The pre-attack analyzer 260 in performing pre-attack analysis of protection zones considers detection rules 262, malicious behavior 264 of a site or service, connectedness 266 of a site or service, vulnerabilities 268 of a site or service, potential threats 270 of a site or service, classification 272 of a site or service, context 274 in which a site or service is accessed (e.g., user account, user identifier, or synthetic identifier used for access) and anomalies 276 of a site or service. Based on the pre-attack analysis, a threat response 280 is instituted, for example by the security agent 16 and the security manager 20. The threat response 280 includes endpoint mitigation 282, network mitigation 284, reports and alerts 286, and browser mitigation 288.

Figure 4A:
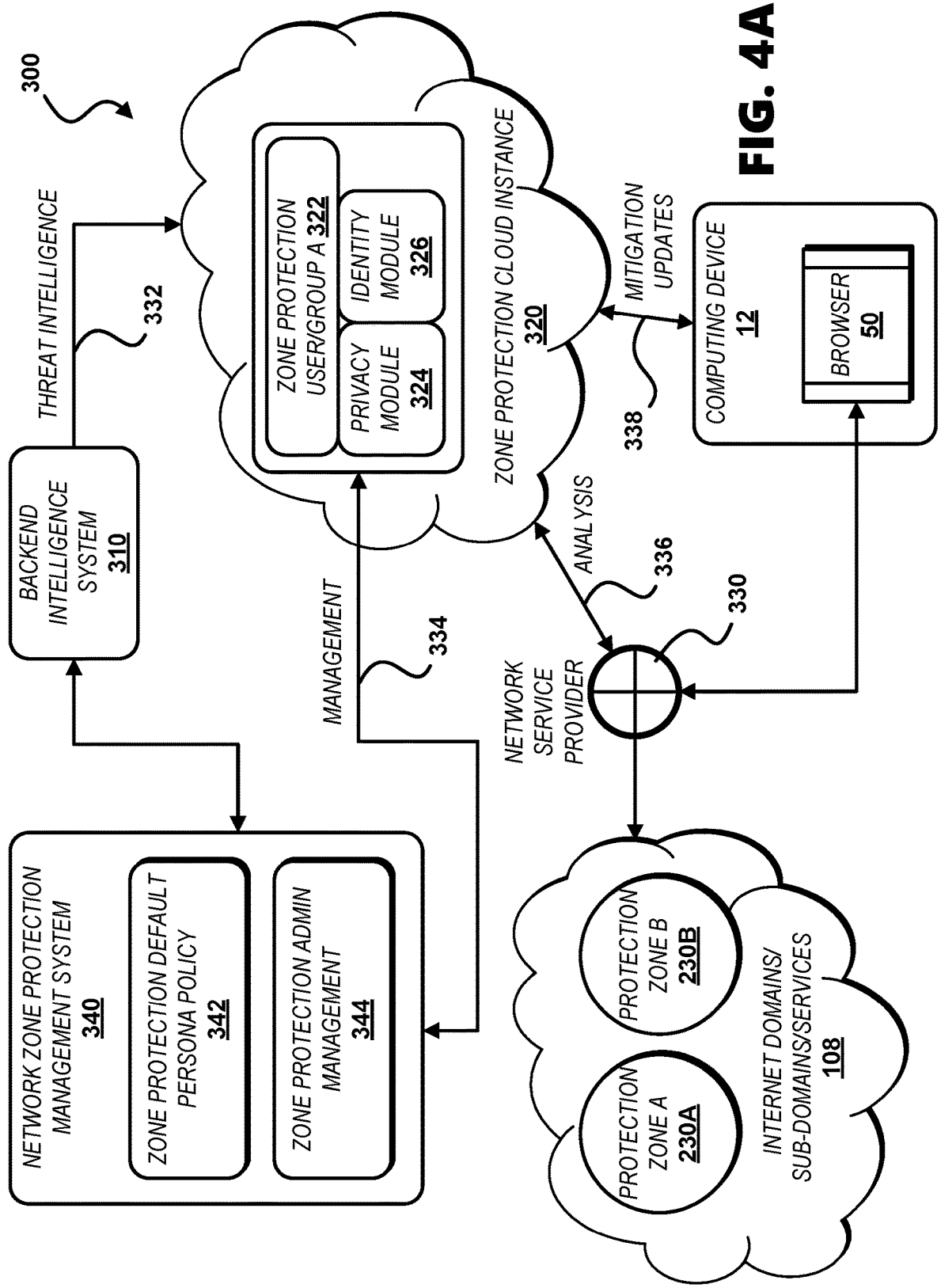
FIG. 4A shows a computing security threat protection environment in the form of a browser-enabled zone protection environment.

Referring to FIG. 4A, a computing security threat protection environment in the form of a browser-enabled zone protection environment 300 is shown in which the security manager 20 or the intelligence engine 22 can take the form of a zone protection cloud instance 320 with support from or integrally provided with a backend intelligence system 310 and a network zone protection management system 340. The backend intelligence system 310 beneficially provides internet protection and threat intelligence for the browser 50 and forwards security threat intelligence 332 to the zone protection cloud instance 320 driving deeper analysis and correlation. For each user or group of users, the zone protection cloud instance 320 establishes a protection module, for example a zone protection module 322 for user/group A. The zone protection module 322 includes a privacy module 324 including privacy preferences for the particular user or group of users and an identity module 326 including identifiers of the particular user or group of users.

The zone protection cloud instance 320 scans and analyzes threats (process 336) within protection zones, for example the protection zone A 230A for user/group A and the protection zone B 230B for user/group B in the network grouping 108. The zone protection cloud instance 320 runs adjacent to a user's browser 50 allowing the browser 50 to use the internet via a network service provider 330 (e.g., an internet service provider) in a normal manner. The browser 50, provided integral with a security agent 16, provides mitigation of threats based on mitigation updates 338 from the zone protection cloud instance 320. Further, the browser 50 allows definition and auto-learning for protections zones. The network zone protection management system 340 manages zone protection infrastructure via a zone protection default persona policy 342 and a zone protection administration management component 344 through management processes 334.

Figure 4B:
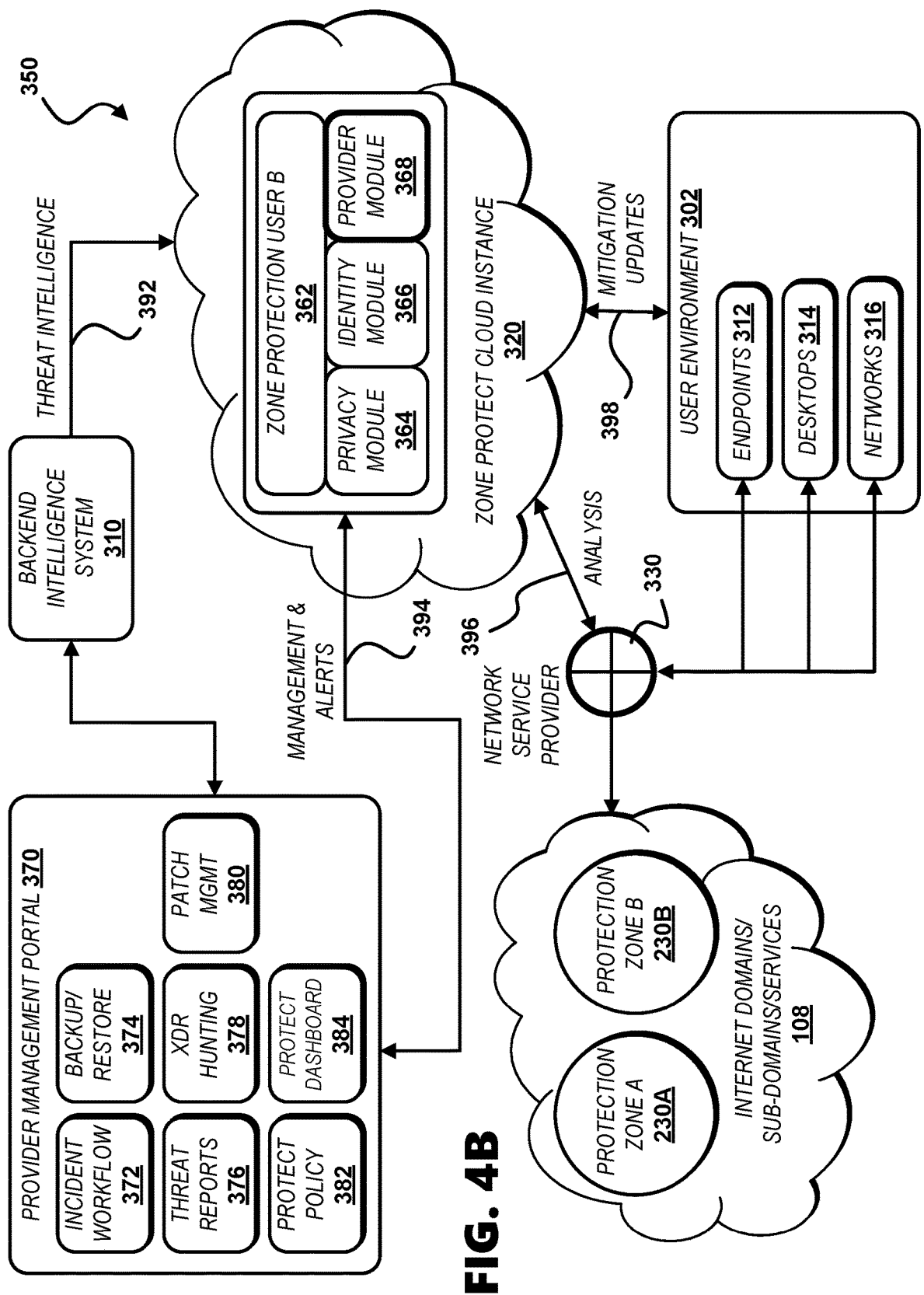
FIG. 4B shows a computing security threat protection environment in the form of a network service provider enabled zone protection environment.

Referring to FIG. 4B, an alternative computing security threat protection environment in the form of a network service provider enabled zone protection environment 350 is shown in which the security manager 20 or the intelligence engine 22 can take the form of the zone protection cloud instance 320 with support from or integrally provided with a backend intelligence system 310 and a network service provider management portal 370. The backend intelligence system 310 beneficially provides internet protection and security threat intelligence 392 for a network service provider 330 and forwards threat intelligence to the zone protection cloud instance 320 driving deeper analysis and correlation. For each user or group of users for whom network services are provided by a particular network service provider 330, a protection module is established, for example a zone protection module 362 for user/group B, via the zone protection cloud instance 320. The zone protection module 362 includes a privacy module 364 including privacy preferences for the particular user or group of users, an identity module 366 including identifiers of the particular user or group of users, and a provider module 368 including preferences and settings unique to the particular network service provider 330.

The zone protection cloud instance 320 scans and analyzes threats within protection zones, for example the protection zone A 230A for user/group A and the protection zone B 230B for user/group B in the network grouping 108. The zone protection cloud instance 320 runs adjacent to computing systems in a user environment 302 (e.g., a network service provider service plan) of a particular user, which computing systems are provided access to the internet via the particular network service provider 330. The user environment 302 of a particular user can include endpoints 312, for example personal desktop computers, personal laptop computers, handheld mobile computing devices (e.g., cellular devices and WiFi™ enabled devices), or other network-enabled devices operating within and outside networks enabled by the network service provider 330. The user environment 302 can further include geographically static devices such as desktops 314 which for example can be positioned behind a firewall or secure router in a local area network for which network services (e.g., internet connection services) are enabled by the network service provider 330. The user environment 302 can further include networks 316 (e.g., local area networks) of a particular user for which network services are provided by the network service provider.

The endpoints 312, desktops 314, and networks 316, are beneficially provided integral with or accessible to a security agent 16 or other security module managed by the network service provider 330, to provide mitigation of threats based on mitigation updates 398 from the zone protection cloud instance 320. Further, the network service provider 330 allows definition and auto-learning of protections zones. The network service provider management portal 370 provides a management, alert, and mitigation dashboard including an incident workflow module 372, backup and restore module 374, threat reports module 376, extended detection and response ("XDR") hunting module 378, patch management module 380, protection policy module 382, and protection dashboard 384.

The protection dashboard 384 enables the showing of alerts and risks to an administrative user of network service provider 330 corresponding to one end user or a plurality of end users in aggregate. Particularly, the protection dashboard 384 enables the showing of aggregated protection zones and coverage, amount of and trends of threats protected against, analysis and scanning activities, and other aggregated metrics. A user-specific view is also enabled which can be rendered accessible to an administrative user of the network service provider 330 or an end user. The user-specific view can show alerts and risks, protection zones and coverage, amount of and trends of threats protected against, analysis and scanning activities, a number of phishing sites detected, a number of malicious links detected, and a number of malicious files inspected. The number of phishing sites detected or malicious links detected can include sites browsed to or not browsed to. The number of malicious files inspected can include a number of malicious files download to the particular end user's device (e.g., endpoints 312, desktops 314, and other devices within networks 316) or the number of malicious files downloaded to an aggregated plurality of devices of one or more end users.

Figure 5:
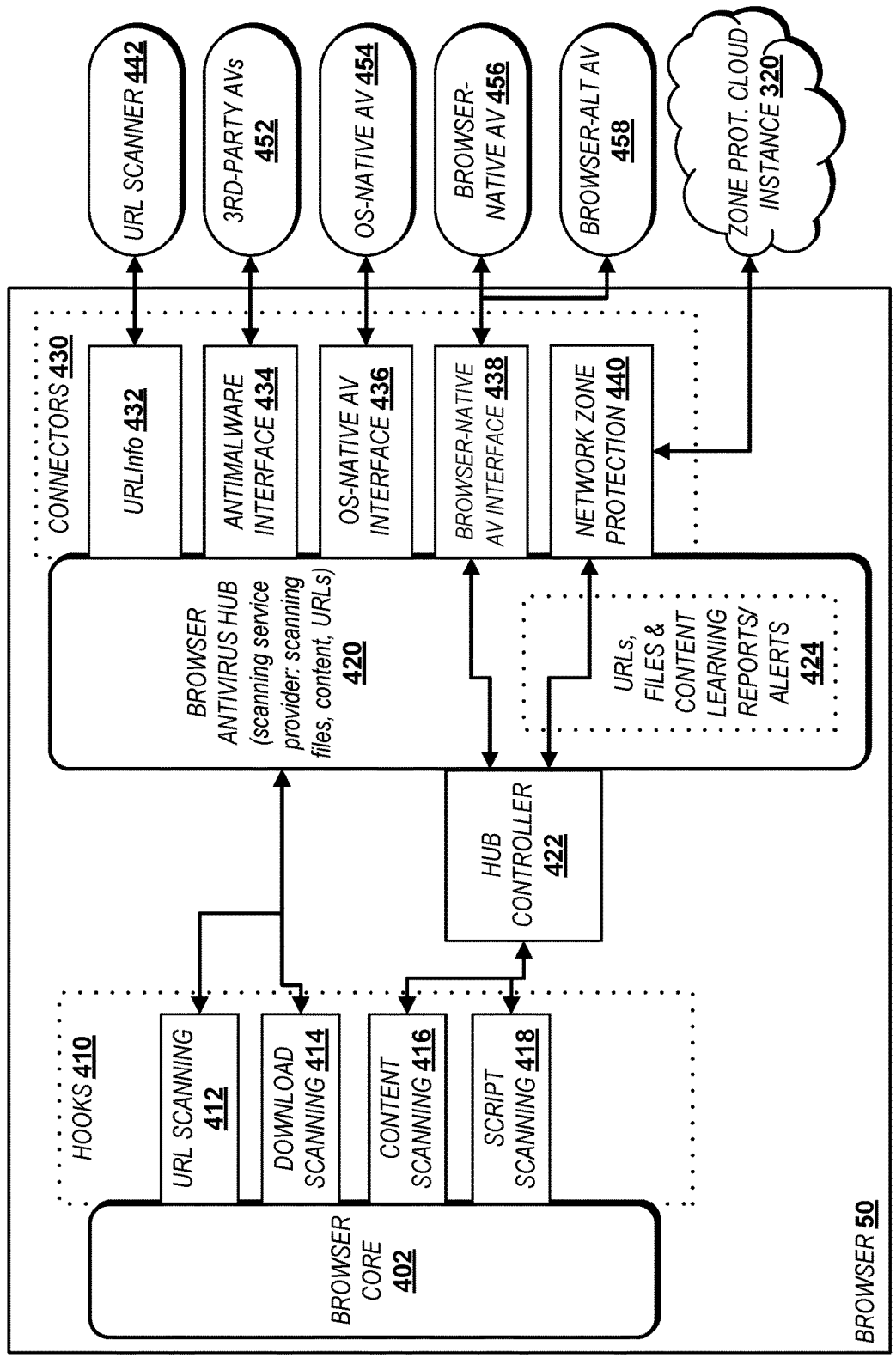
FIG. 5 shows a browser connection configuration for implementing zone protection schemes in a computer network.

Referring to FIG. 5, a browser connection configuration 400 for implementing zone protection schemes in a computer network according to illustrative embodiments is shown. The browser 50 includes a browser core 402 linked to a browser antivirus hub 420 and a hub controller 422 via a plurality of hooks 410. The hooks 410 include a URL scanning hook 412, download scanning hook 414, content scanning hook 416, and script scanning hook 418. The URL scanning hook 412 and download scanning hook 414 connect directly to the browser antivirus hub 420 which acts as a scanning service provider for scanning files, content, and URLs. The content scanning hook 416 and the script scanning hook 418 connect to the browser antivirus hub 420 via a hub controller 422. The browser antivirus hub 420 is responsible for generating learning data and reports and alerts based on scanned URLs, files, and content (process 424).

The browser antivirus hub 420 implements connectors 430 to interface with external applications, extensions, and add-ons. A URLInfo connector 432 communicates with a URL scanner 442 which can be provided integral with the browser 50 or externally via a third-party application. An antimalware interface 434 connects with one or more third-party antivirus applications 452. An operating system ("OS") native antivirus interface 436 connects with an OS-native antivirus application 454 which includes an antivirus application packaged with the OS of the device on which the browser 50 is executed. A browser-native antivirus interface 438 connects with a browser-native antivirus application 456 and a browser-alternative antivirus application 458, which include antivirus applications configured for integration with the browser 50. A network zone protection connector 440 connects with the zone protection cloud instance 320. As described, the hooks 410, browser antivirus hub 420, hub controller 422, and connectors 430 form the security agent 16 in an embodiment integrally formed with the browser 50.

Figure 6:
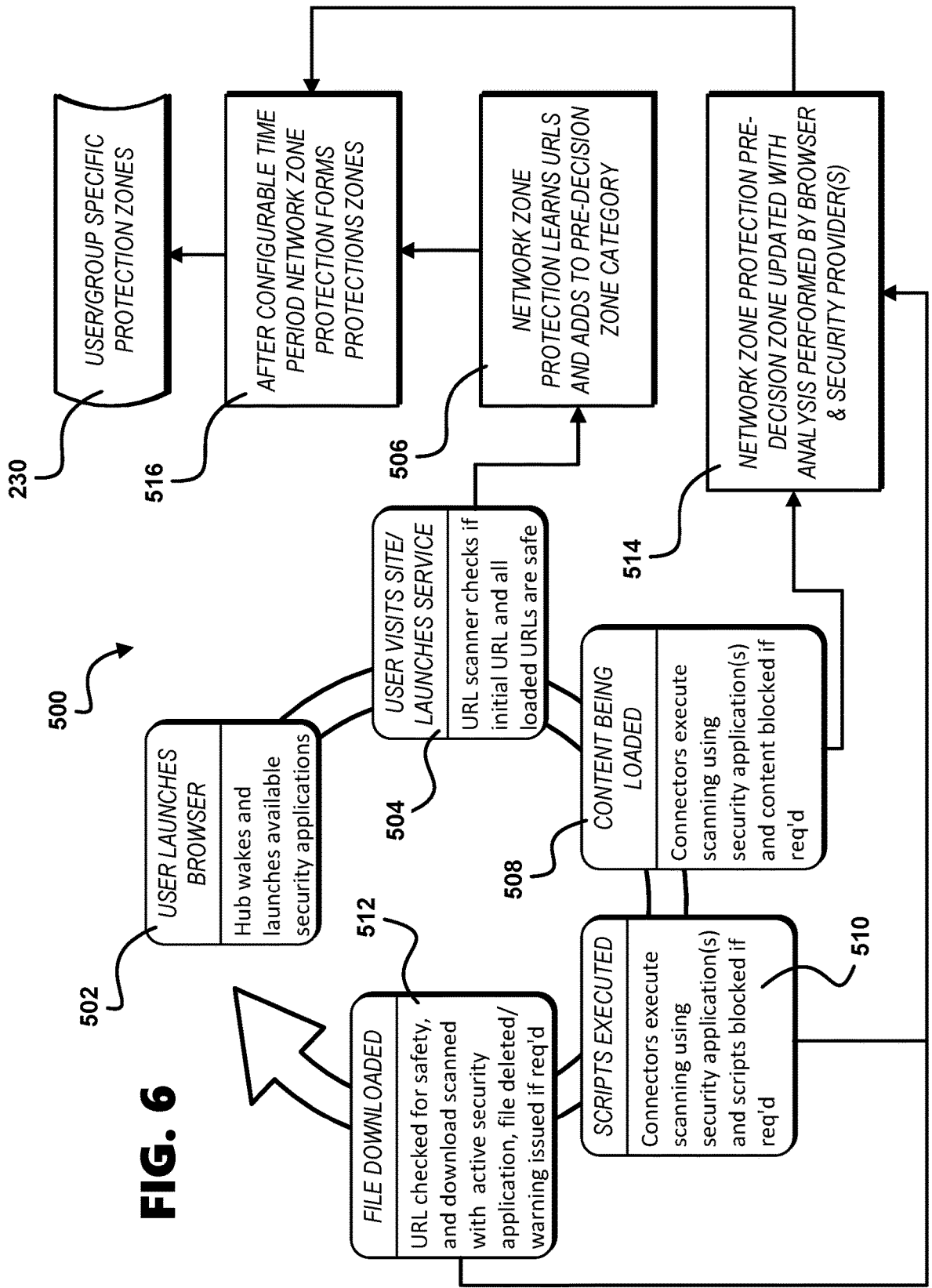
FIG. 6 is a process flow diagram showing an auto learning process for generating protection zones in a computer network.

Referring to FIG. 6, a process flow diagram shows an auto learning process 500 for generating protection zones in a computer network (e.g., user/group protections zones 230A, 230B) via the browser 50 and the zone protection cloud instance 320. In a step 502, a browser 50 is launched by a user on a computing device 12, and the browser antivirus hub 420 wakes and loads available security providers via the connectors 430. In a step 504, responsive to a user visiting a website via the browser 50, the URL scanner 442 checks if the initial URL and all other loaded URLs are safe. The network zone protection connector 440 enables via the zone protection cloud instance 320 learning of the scanned URLs and adding of the scanned URLs to a pre-decision zone category (step 506). As content is being loaded from a visited site, connectors 430 execute scanning and analysis of the content using one or more appropriate security applications, for example one or more of the antivirus applications 452, 454, 456, 458, and the content is selectively blocked if required based on the scanning and analysis (step 508). As scripts are being executed from a visited site, connectors 430 execute scanning and analysis of the content using one or more appropriate security applications, for example one or more of the antivirus applications 452, 454, 456, 458, and the scripts are selectively blocked if required based on the scanning and analysis (step 510).

After a file is downloaded from a visited site, the URL from which the file is downloaded is checked for safety, if not already checked, and the download is scanned and analyzed with an active security application for example one or more of the antivirus applications 452, 454, 456, 458, and the downloaded file is deleted or a warning is issued if required based on the scanning and analysis (step 512). In a step 514, a network zone protection pre-decision zone is updated based on the analysis performed by the browser 50 and the one or more active security applications which analysis is set forth in step 508, step 510, and step 512. After a configurable time period, in a step 516 network zone protection connector 440 via the zone protection cloud instance 320 forms user or group specific protection zones 230, for example the user/group protections zones 230A, 230B.

Figure 7:
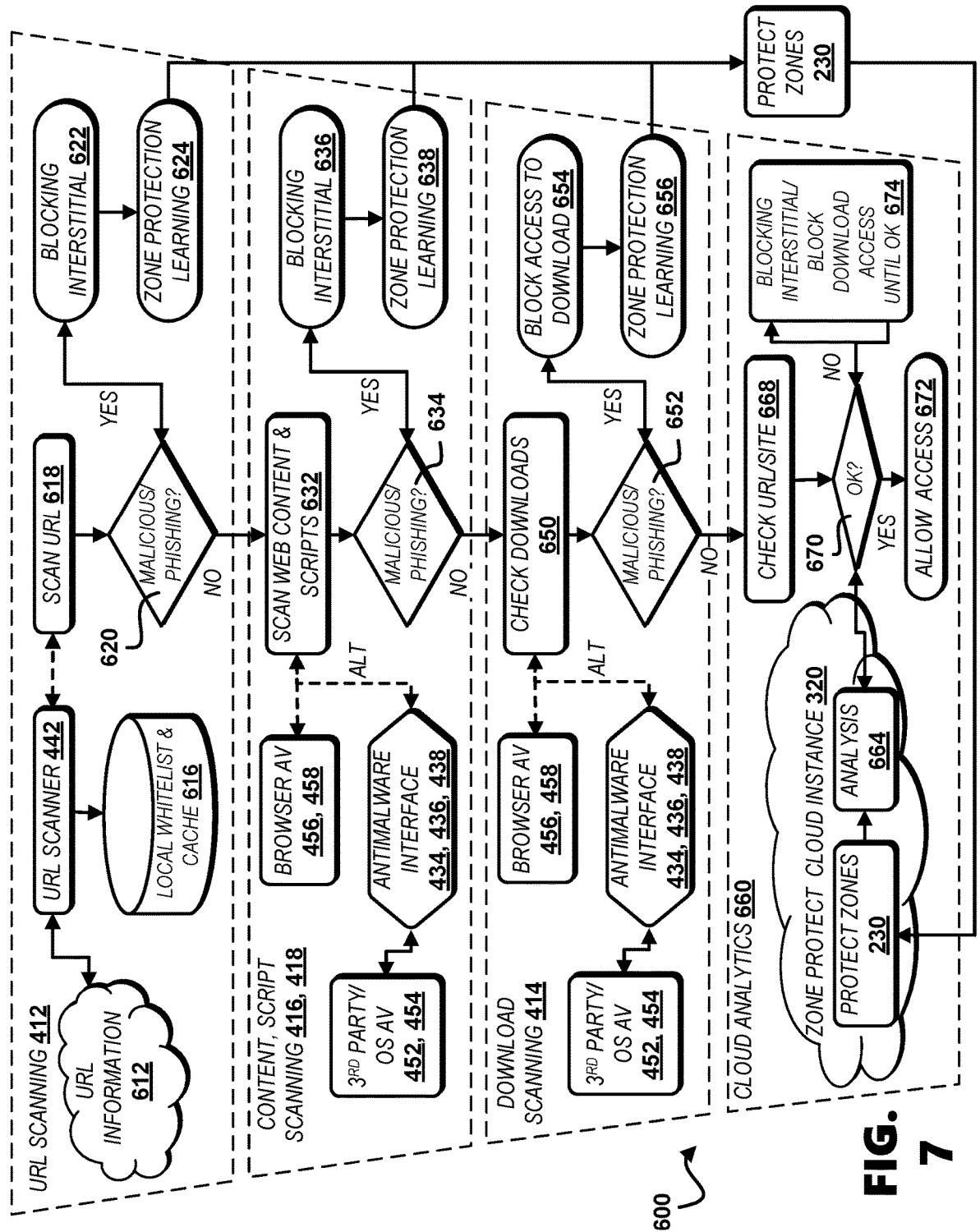
FIG. 7 shows a layered analytics process for mitigating a computing security threat.

Referring to FIG. 7, a layered analytics process 600 is shown for mitigating a computing security threat. The layered analytics process 600 is implemented via a browser 50 and a zone protection cloud instance 320, and the layered analytics process 600 is initiated at the URL scanning hook 412 of the browser 50. The URL scanner 442 gathers URL information 612 of a visited site and whitelist data from a local whitelist and cache datastore 616 and scans a URL of the visited site (step 618) to determine if the URL is associated with malicious activity or phishing activity (step 620). If the URL is determined to be associated with malicious or phishing activity, the browser 50 initiates a blocking interstitial 622. The blocking interstitial 622 is beneficially in a window in which the URL is accessed in the user interface 58 of the computing device 12 of the user to prevent user interaction with content of the site located by the URL. Zone protection learning is instituted in step 624 based on the determining that the URL is associated with malicious or phishing activity. For example, the zone protection cloud instance 320 via the network zone protection connector 440 learns a scanned URL and adds the scanned URL to a pre-decision zone category, as described with reference to step 506 of the auto learning process 500.

If it is determined that the URL of a visited site is not associated with malicious activity or phishing activity (step 620), the layered analytics process 600 is continued via the content scanning hook 416 and script scanning hook 418 of the browser 50. In a step 632, the web content and scripts of the visited site are scanned via the browser-native antivirus application 456 or the browser-alternative antivirus application 458 via the browser-native antivirus interface 438. Alternatively, the web content and scripts of the visited site can be scanned via the third-party antivirus application 452 or the OS-native antivirus application 454 via a respective connector interface 434, 436. If content or a script of the visited site is determined to be associated with malicious or phishing activity (step 634), the browser 50 initiates a blocking interstitial 636 in the window in which the URL is accessed in the user interface 58 of the computing device 12 of the user to prevent user interaction with the content of the visited site. Zone protection learning is instituted in step 638 based on the determining that content or a script is associated with malicious or phishing activity. For example, as described with reference to step 514, the network zone protection pre-decision zone is updated based on the analysis performed by the browser 50 and the one or more security applications in step 508, step 510, and step 512 of the auto learning process 500.

If content or a script of the visited site is determined not to be associated with malicious or phishing activity (step 634), the layered analytics process 600 is continued via the download scanning hook 414 of the browser 50. In a step 650, one or more downloads from the visited site are scanned via the browser-native antivirus application 456 or the browser-alternative antivirus application 458 via the browser-native antivirus interface 438. Alternatively, the one or more downloads of the visited site can be scanned via the third-party antivirus application 452 or the OS-native antivirus application 454 via a respective connector interface 434, 436. If a download is determined to be associated with malicious or phishing activity (step 652), the browser 50 blocks access to the download (step 654) and can further delete the download. Zone protection learning is instituted in step 656 based on the determining that a download is associated with malicious or phishing activity. For example, as described with reference to step 514, the network zone protection pre-decision zone is updated based on the analysis performed by the browser 50 and the one or more security applications performed in step 508, step 510, and step 512 of the auto learning process 500.

Based on the zone protection learning in step 624, step 638, and step 656, protection zones 230 are formed. For example, after a configurable time period, as described with reference to step 516 of the auto learning process 500, the zone protection cloud instance 320 via the network zone protection connector 440 forms user or group specific protection zones 230, for example the user/group protections zones 230A, 230B.

The layered analytics process 600 is continued via the network zone protection connector 440 of the browser 50 in a cloud analytics layer 660. If a download is determined not to be associated with malicious or phishing activity (step 652), the URL and the visited site defined by the URL are checked (step 668) based on the defined protection zone 230 corresponding to the particular user and an analysis 664 performed at the zone protection cloud instance 320. A blocking interstitial is initiated in the user interface 58 or access to a downloaded file from the visited site is blocked in step 674 until such time as acceptable results are available from the zone protection cloud instance 320 as determined in step 670, and after such time that acceptable results are available the blocking interstitial is removed or access to the downloaded file is allowed in step 672. A protection zone 230 formed based on the activity of a particular user of a browser 50 on a particular computing device 12 can be implemented in real time or at a later time by the zone protection cloud instance 320 in the analysis 664 for the particular user on the particular computing device 12. Alternatively, a protection zone 230 formed based on the activity of a particular user of a browser 50 on a particular computing device 12 can be implemented in real time or at a later time by the zone protection cloud instance 320 in the analysis 664 for another user on another computing device 12, the other user for example sharing a network service plan with the particular user or having matching demographic information with the particular user.

Figure 8:
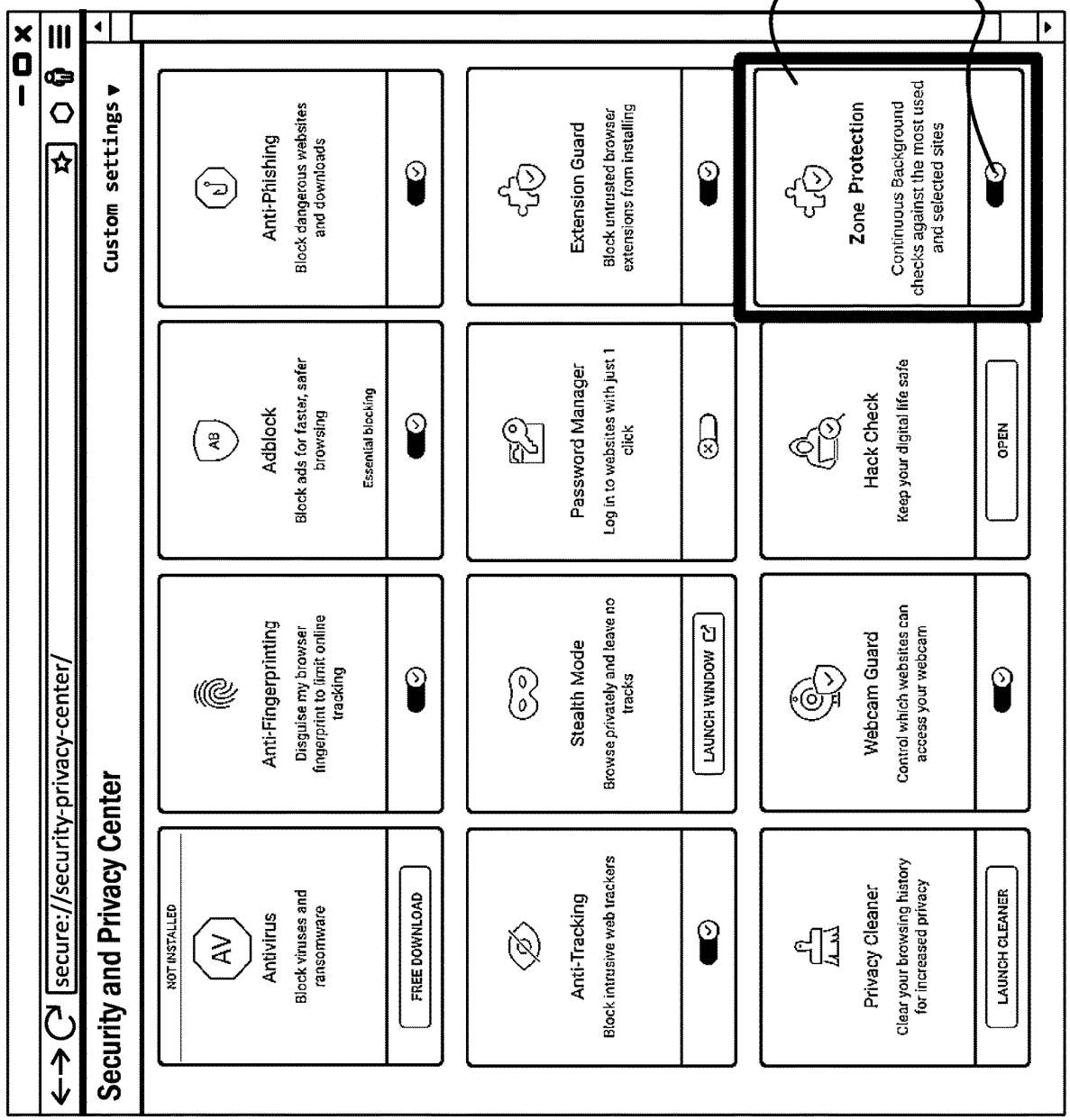
FIG. 8 shows a security module selection browser window enabled by a browser in a user interface of a computing device according to illustrative embodiments.

Referring to FIG. 8, an exemplary security module selection browser window 680 is shown which is enabled by the browser 50 via the connectors 430 within the user interface 58 of a computing device 12. The security module selection browser window 680 enables selection by a user of a plurality of security features for use integral with the browser 50. The network zone protection connector 440 is enabled as an extension in the browser 50 by a user's actuation of a toggle switch 684 on a zone protection module 682 displayed among other modules in the security module selection browser window 680.

Figure 9:
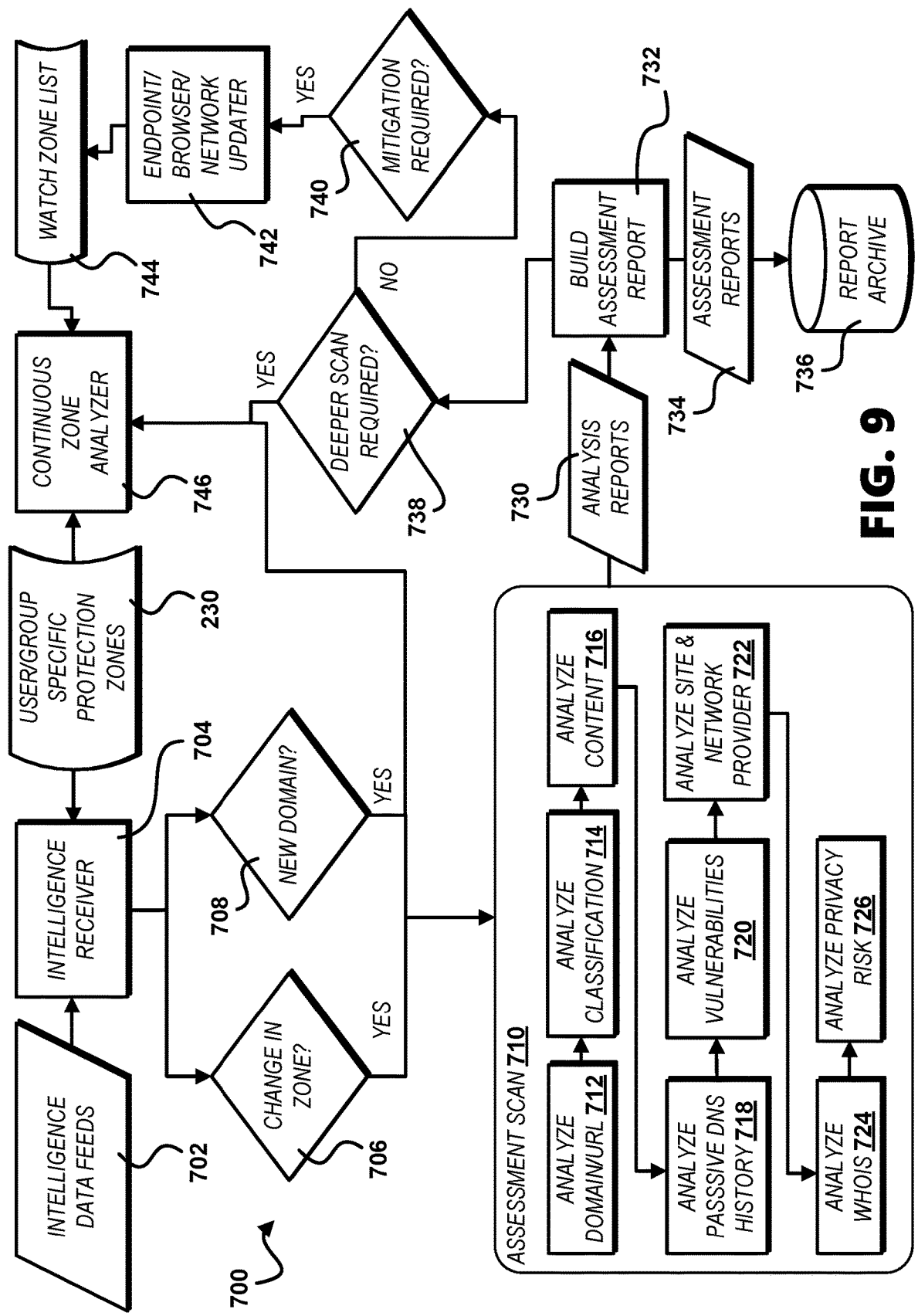
FIG. 9 is a diagram showing a zone protection process according to illustrative embodiments.

Referring to FIG. 9, a flow diagram sets forth a zone protection process 700 enabled by the zone protection cloud instance 320 via the network zone protection connector 440. Intelligence data feeds 702 are generated by the zone protection cloud instance 320 and the backend intelligence system 310, one or both of which taking the form of the security manager 20 can accumulate intelligence from web/app servers 40 hosting a plurality of sites and services. Exemplary intelligence data of the intelligence data feeds 702 and corresponding exemplary use by one or more of the security manager 20, security agent 16, browser 50, and zone protection cloud instance 320 is set forth in Table 1.

TABLE 1

| Intelligence data | Use |
| --- | --- |
| New domain registrations | Analyze active or inactive sites and their relevance to protection zone threats; determine parking lot domains (e.g., without active sites) and prevalence versus activity. |
| New domain (and subdomain) activations | Trigger scanning and analysis of corresponding site content and domain and subdomain relationships to other content. |

TABLE 1-continued

| Intelligence data | Use |
| --- | --- |
| WHOIS information | Provide metadata associated with sites and their relationships to other legitimate or malicious sites; help to validate legitimate sites. |
| Passive DNS | Generate active and historical IP address mappings; determine existence of and correlation to other internet sites; change tracking for both new and updated addresses. |
| Certificates | Validate deliberate and inadvertent (e.g., configuration) security issues. |
| Vulnerabilities | Determine vulnerability relevance and prevalence; includes assessment of active vulnerabilities being exploited and relationship to protection zones. |
| Service Discovery | Determine expected services and match for known bad or suspicious services. |
| Border Gateway Protocol ("BGP")/ Network associations | Analyze sites and their relationships to expected versus unexpected routing; identify suspicious network changes affecting sites included in and supporting protection zones. |
| Geolocation | Analyze and correlate sites to expected geolocation vs actual geolocation; identify specific risky known regions that may cluster anomalous/malicious network service providers. |
| Known phishing domains & URLs | Alert re malicious content and mitigate malicious content; determine proximity to new domains/URLS that match determined patterns. |
| Privacy information | Provide insight as to how sites treat customer privacy; generate scores for sites based on users' protection zones and users' use of sites. |
| Tracking information | Alert user before use of site for particular sites or applications that use malicious or suspicious methods to track customers; generate scores for sites based on users' protection zones and users' use of sites. |
| Device category profiles; including sites that devices in a particular category (e.g., IoT devices) typically connect to | Analyze sites for malicious content and connectedness. |

The intelligence data feeds 702 are received by an intelligence receiver 704 for example integrated with the intelligence engine 22 in the zone protection cloud instance 320. Based on the intelligence data feeds 702, the intelligence engine 22 determines in step 706 if a change occurred in a particular protection zone 230 associated with a particular user or group of users, for example a change in content or links at a particular website defined as within the particular protection zone 230. The intelligence engine 22 further determines at a step 708 if a new domain has originated within the protection zone 230, for example if a link to a new domain is found in a site within the protection zone 230 or a new domain is detected corresponding to a field of use associated with the protection zone (e.g., a new banking industry related domain name).

If a change in the protection zone 230 or a new domain has originated, the intelligence engine 22 attends to an assessment scan 710 of the changed protection zone or new domain, beneficially incorporating analyses described in Table 1. Particularly, the assessment scan 710 includes analyzing any new, recently detected, or changed domain and associated URL including associated classifications (step 712), analyzing connections to new, recently detected, or changed sites (step 714), analyzing content of new, recently detected, or changed sites (step 716), analyzing passive DNS history of new, recently detected, or changed sites (step 718), analyzing vulnerabilities of new, recently detected, or changed sites (step 720), analyzing site provider and network service provider of new, recently detected, or changed sites (step 722), analyzing WHOIS records of domains of new, recently detected, or changed sites (step 724), and analyzing privacy risk of new, recently detected, or changed sites (step 726). Exemplary analysis enabled by the intelligence engine 22 and corresponding exemplary uses are set forth in Table 2.

TABLE 2

| Analysis | Use |
| --- | --- |
| Content analysis (e.g., website content) | Check Windows ™, MacOS ™, Android ™ and other content files in a sandbox; check content files' connections and static/dynamic behavior; leverage both file download and execution with user credentials/synthetic credentials if available. |
| Intelligence single factor | Match on any high confidence/high accuracy data feed for known suspicious content. |
| Intelligence multi-factor | Match on multiple aspects of both metadata and content analysis to trigger alert or mitigation action (e.g., a Windows ™ executable [".exe"] less than 30 days old that connects to known suspicious hosting provider). |
| Graph analysis | Determine how a site is connected to other internet content and build a graph of connectedness to enable identifying metadata that helps identify multiple content or sites that are representative of malicious content. |
| Anomaly detection | Based on continuous checking of protection zones, monitor for any changes to the metadata or content on sites that are anomalous to a specific user's profile or user group's profile based on known usage patterns. |

Based on the assessment scan 710, analysis reports 730 are generated which are used to build assessment reports 734 in step 732, which assessment reports 734 are stored in a report archive 736. Based on the assessment reports 734, the intelligence engine 22 determines in a step 738 if a deeper scan is required than was performed in the assessment scan 710. If a deeper scan is not required, the intelligence engine 22 determines if mitigation is required based on whether a threat is determined based on a particular assessment report 734 (step 740). If mitigation is required based on a threat, an endpoint/browser/network updater 742 integrated with or connected to the security manager 20 or security agent 16 initiates a threat response 280 (referring to FIG. 3) including one or more of endpoint mitigation 282, network mitigation 284, browser mitigation 288, and reports and alerts 286. Mitigations can include restricting access to a threatening site or service at an endpoint level, browser level, or network level. Mitigations can further include providing reports and alerts for a user regarding a threatening site or service at an endpoint level, browser level, or network level, for example via a browser 50 or other application on a computing device 12, or at an endpoint 312 or networks 316 in a user environment 302. Sites determined to require mitigation are further placed on a watch zone list 744.

If a deeper scan is required in step 738, the zone protection process 700 continues at a continuous zone analyzer 746 beneficially integrated with the intelligence engine 22. The continuous zone analyzer 746 re-checks the protection zones 230 and the watch zone list 744 and can initiate alerts and restrictions at an endpoint level, browser level, or network level.

Figure 10A:
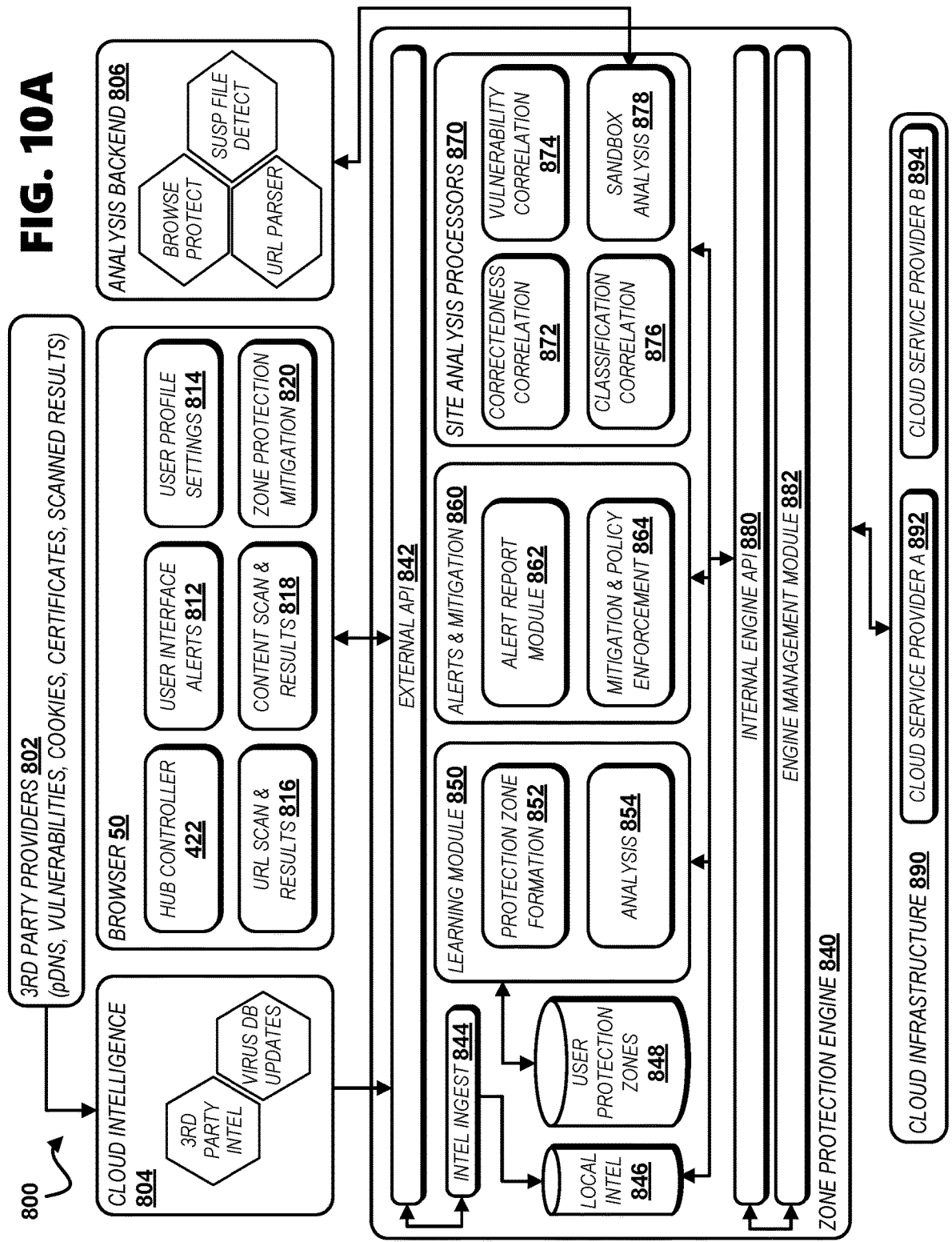
FIG. 10A shows an exemplary architecture for implementing zone protection processes in a computer network.

Referring to FIG. 10A, a first exemplary architecture 800 for implementing zone protection processes in a computer network according to illustrative embodiments is shown. The first exemplary architecture 800 enables learning via a zone protection engine 840 and use of third-party intelligence and scanning from third-party providers 802. An analysis backend 806 is provided for performing a major portion of the analyses required by the zone protection engine 840. The first exemplary architecture 800 further enables applying zone protection mitigation 820 and providing user interface alerts 812 via the browser 50.

Cloud intelligence 804 is beneficially based on third-party intelligence and virus database updates. The third-party intelligence can include network security information from third-party providers 802 including for example passive domain name system ("pDNS") data, network vulnerabilities, cookies, certificates, and scanned results from monitored or analyzed network destinations.

The browser 50 includes the hub controller 422 that aggregates threat analyses via connectors 430. User interface alerts 812, user profile settings 814, URL scanning and results 816, content scanning and results 818, and zone protection mitigation 820 are enabled via the browser 50. The zone protection engine 840 is enabled by a cloud infrastructure 890 for example including a first cloud service provider "A" 892 and a second cloud service provider "B" 894. The cloud intelligence 804 including the third-party intelligence and virus database updates are received via an external application program interface ("API") 842 by the zone protection engine 840. Intelligence in the form of user profile settings 814, URL scanning and results 816, content scanning and results 818 are received via the external API 842 from the browser 50. Learning performed in the zone protection engine 840 is fed back to the browser 50 via the hub controller 422 and used in forming user interface alerts 812 and zone protection mitigation 820 of threats.

Intelligence is triaged at an intelligence ingestion module 844 and stored in a local intelligence datastore 846. Intelligence is used at a learning module 850 for protection zone formation 852 and analysis 854, which protection zones are stored in a user protection zone datastore 848. Intelligence is also used at an alerts and mitigation module 860 at an alert report module 862 for generating user alerts and at a mitigation and policy enforcement module 864 for generating mitigation instructions. Intelligence is further used by site analysis processors 870 for connectedness correlation 872, vulnerability correlation 874, classification correlation 876, and sandbox analysis 878 for monitored sites. Sandbox analysis 878 is performed at an analysis backend system 806, which enables protecting a user from browsing malicious sites, enables detecting and analyzing suspicious and rare files a user attempts to execute, and enables a URL parser, for example URLLite™. An engine management module 882 manages transactions of the zone protection engine 840 via an internal engine API 880.

Figure 10B:
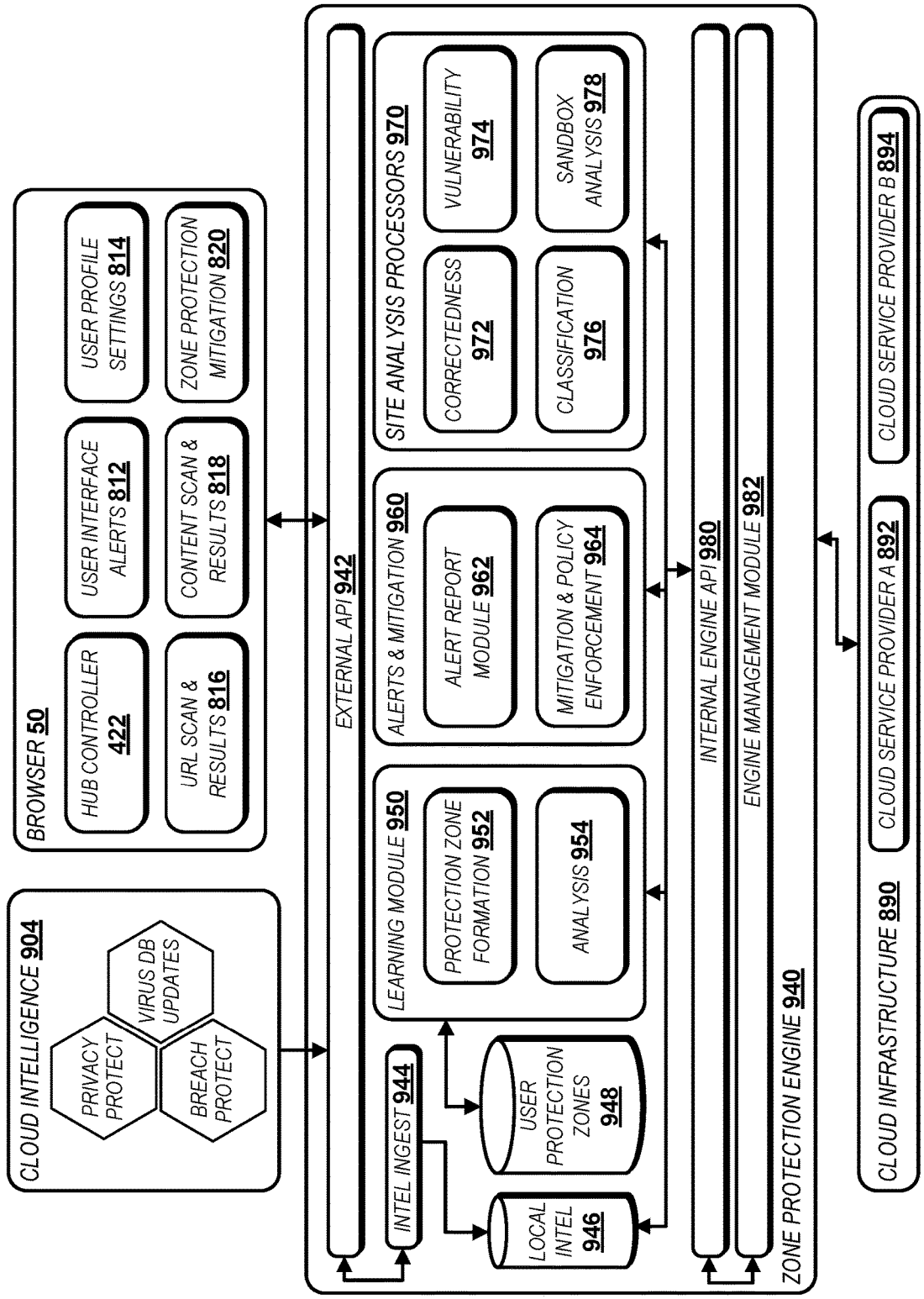
FIG. 10B shows another exemplary architecture for implementing zone protection processes in a computer network.

Referring to FIG. 10B, a second exemplary architecture 900 for implementing zone protection processes in a computer network according to illustrative embodiments is shown. The second exemplary architecture 900 enables learning via a zone protection engine 940 and use of cloud intelligence 904, for example cloud intelligence 904 aggregated from browser add-ons and extensions to the browser 50 on a computing device 12. Significant analysis is performed within a zone protection engine 940. Zone protection mitigation 820 is integrated with the browser 50, and user interface alerts 812 are enabled via the browser 50.

Cloud intelligence 904 is generated based on monitoring privacy protection modules and breach protection extensions or add-ons implemented on a plurality of browsers 50. Cloud intelligence 904 further includes virus database updates. The browser 50 includes the hub controller 422 that aggregates threat analyses via connectors 430. User interface alerts 812, user profile settings 814, URL scanning and results 816, content scanning and results 818, and zone protection mitigation 820 are enabled via the browser 50.

The zone protection engine 940 is enabled by the cloud infrastructure 890 for example including the first cloud service provider A 892 and the second cloud service provider B 894. The cloud intelligence 904 is received via an external application program interface ("API") 942 by the zone protection engine 940. Intelligence in the form of user profile settings 814, URL scanning and results 816, content scanning and results 818 are received from the browser 50 by the zone protection engine 940 via the external API 942. Learning performed in the zone protection engine 940 is fed back to the browser 50 via the hub controller 422 and used in forming user interface alerts 812 regarding threats.

Intelligence is triaged at an intelligence ingestion module 944 and stored in a local intelligence datastore 946. Intelligence is used at a learning module 950 for protection zone formation 952 and analysis 954, which protection zones are stored in a user protection zone datastore 948. Intelligence is further used at an alerts and mitigation module 960 at an alert report module 962 for generating user alerts and at a mitigation and policy enforcement module 964 for generating mitigation instructions. Intelligence is further used by site analysis processors 970 for determining connectedness 972, determining vulnerability 974, classification 976, and performing sandbox analysis 978 for monitored sites. An engine management module 982 manages transactions of the zone protection engine 940 via an internal engine API 980.

A first exemplary circumstance showing the implementation of the systems described herein is explained with reference to FIGS. 3, 4A, 4B, and 11-14. In the first exemplary circumstance, a new domain "www.polymersbank.com" ("polymersbank.com") has been registered and activated, and a corresponding website ("site") has been launched. In the first exemplary circumstance, the site registration information (e.g., WHOIS information) for polymersbank.com is assumed to have been obfuscated by the party who launched the site, so ownership of the site is unclear. The site appears to be owned or affiliated with a "Polymer Bank", but the site is not actually owned or affiliated with the real Polymer Bank. For purposes of the first exemplary circumstance, it can be assumed that the actual Polymer Bank uses a different domain (e.g., "polymerbank.com," without an "s").

Figure 11:
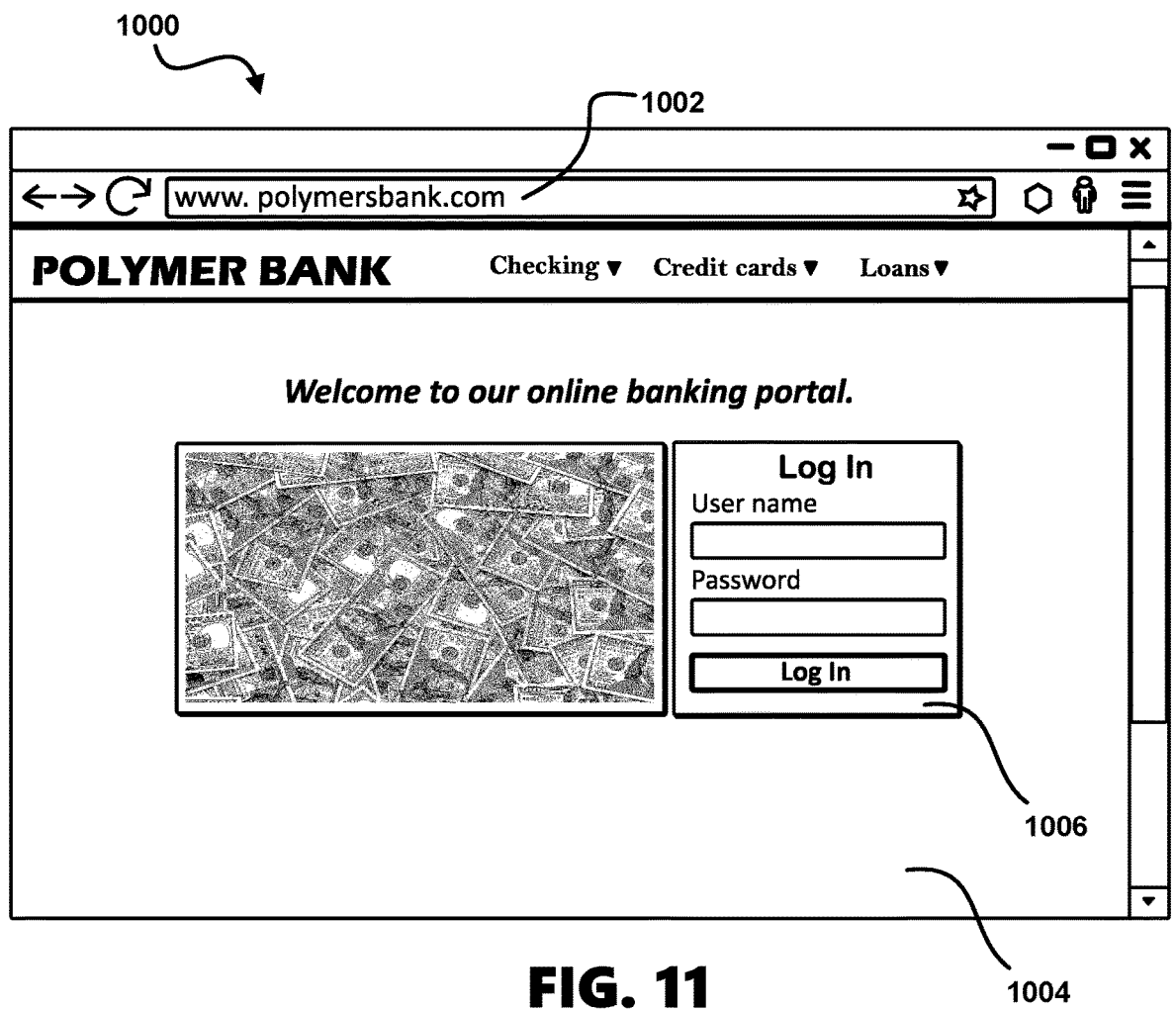
FIG. 11 shows an exemplary webpage screen capture of a potentially threatening website.

Continuing with the first exemplary circumstance, a particular device user receives an email from what appears to be Polymer Bank advertising a new personalized service option, which email provides a particular link to polymersbank.com The particular link is followed by the user via a browser 50 executed on their endpoint device, for example the computing device 12. Referring to FIG. 11, a webpage browser window screen capture 1000 of an exemplary webpage to which the particular link is directed is shown. The polymersbank.com domain name is shown in a browser window address bar 1002 and the web page includes content 1004 including a login module 1006 prompting a user for sensitive information including their username and password.

For the purpose of explanation regarding the first exemplary circumstance, it is first assumed that that network zone protection connector 440 and the zone protection cloud instance 320 are not enabled for the browser 50. A network security inspection enabled by one or more of the other connectors 430 (e.g., antivirus software) or enabled by an external system can analyze an exemplary grouping of metadata 1200 including a domain 1212, certificates 1214, SSL settings 1216, and an Internet Protocol ("IP") address 1218 of polymersbank.com and block polymersbank.com if any blacklists or signatures match corresponding indicators of compromise ("IOCs"). In this example, polymersbank.com has not been determined to include IOCs matching known threats, so it remains unblocked. In such case, content of polymersbank.com may be viewed by network security monitoring as noise and not trigger any protective action or alert when the network zone protection connector 440 and the zone protection cloud instance 320 are not enabled for the browser 50.

Figure 13:
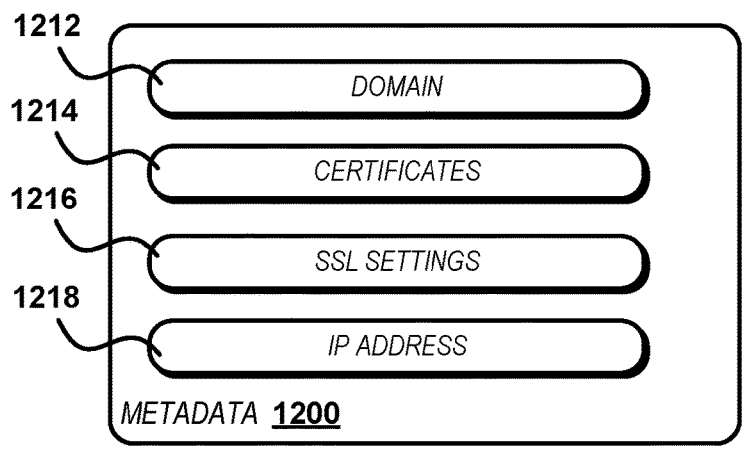
FIG. 13 is a diagram depicting metadata serving as intelligence data used in processes according to illustrative embodiments.

When the endpoint, for example a computing device 12, connects to the polymersbank.com site via the browser 50, endpoint inspection is enabled by one or more of the connectors 430 (excluding the network zone protection connector 440) via one or more of the URL scanner 442 or antivirus applications 452, 454, 456, 458. Referring to FIG. 13 showing the exemplary grouping of metadata 1200, the endpoint inspection includes checking the domain 1212, certificates 1214, SSL settings 1216, and Internet Protocol ("IP") address 1218 against any black lists. The endpoint inspection further includes analyzing site content within available time constraints, performing both static and dynamic inspections, and uploading selected files from the site to a network located or cloud-based processing system for further analysis. In the first imaginary example, a malicious Jscript file is downloaded via the browser 50 to the user's endpoint (e.g., computing device 12) which captures the user's credentials. Without the network zone protection connector 440 and the zone protection cloud instance 320 enabled, the Jscript file is not blocked because it does not include any IOCs and had never been logged to a blacklist.

Figure 14:
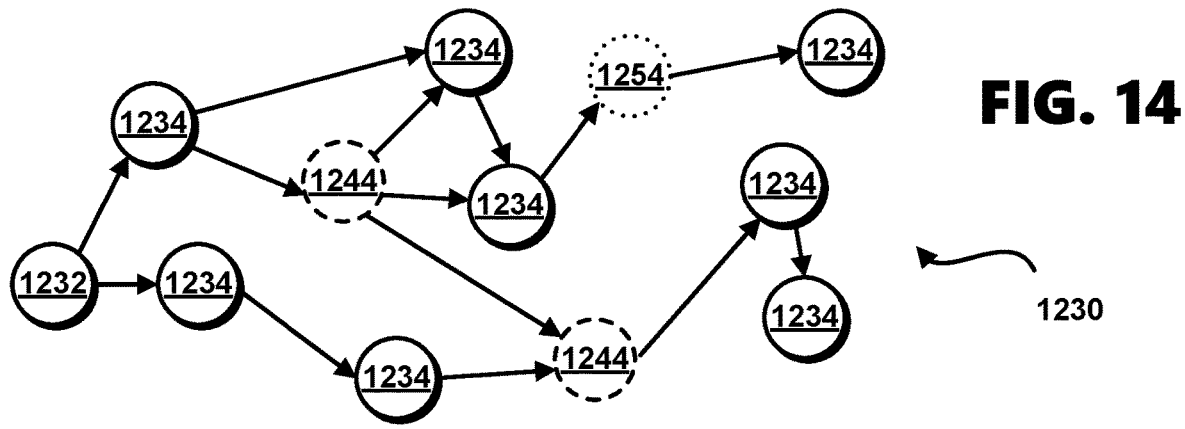
FIG. 14 is a diagram depicting an exemplary internet network structure to which processes according to illustrative embodiments can be applied.

An analysis of content and links of polymersbank.com is further performed based on a public internet view for example via an alternate network-based scanning service, again with the network zone protection connector 440 and the zone protection cloud instance 320 not enabled. Referring to FIG. 14 for example, an internet network structure 1230 including a particular network location 1232 corresponding to polymersbank.com and other network locations 1234, 1244, 1254 linked to the particular network location 1232 are scanned. However, polymersbank.com and linked pages and sites are designed to evade general web crawlers so no detection of a security threat occurs.

For the purpose of further explanation regarding the first exemplary circumstance, it is assumed in the following that that network zone protection connector 440 and the zone protection cloud instance 320 are enabled for the browser 50. Prior to the user attempting to connect to the polymersbank.com site via the browser 50, analysis and mitigation functionality is enabled by the zone protection cloud instance 320. Intelligence data feeds 702 provide threat intelligence data 252 concerning new and changed sites which is correlated against protection zones to match with the protection zones. A list of candidate sites, for example including the exemplary polymersbank.com site, is chosen for deeper inspection based on the correlation.

Figure 12:
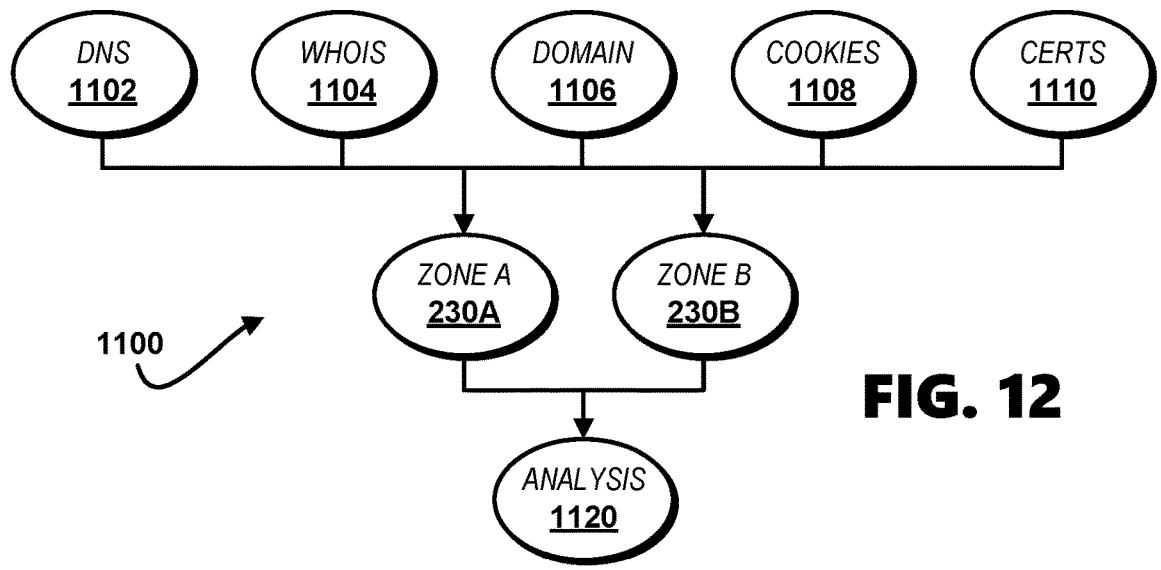
FIG. 12 shows a zone protection process flow according to illustrative embodiments.

Referring to FIG. 12, a zone protection process flow 1100 is shown in which the intelligence data includes for example DNS data 1102, WHOIS data 1104, domain data 1106, cookies 1108, and certifications 1110 for example matching exemplary user/group A protection zone A 230A and user/group B protection zone B 230B. Analysis 1120 is performed for each zone, for example as shown in change in zone decision step 706, new domain decision step 708, and assessment scan step 710. The analysis 1120 includes pre-attack analysis by the pre-attack analyzer 260 which includes scans of surface, content, and connectedness for each candidate site, with a full attack surface assessment of the candidate site's domain, vulnerabilities of the candidate site, WHOIS records of the candidate site, passive DNS records of the candidate site, certificates of the candidate site, cookies of the candidate site, content downloaded from the candidate site, privacy settings of the candidate site, and how data is used by the candidate site. The result is a comprehensive assessment across a large plurality of attack vectors that can affect a user. Beneficially, a candidate site (e.g., polymersbank.com) is further scanned via the zone protection cloud instance 320 with synthetic identification credentials which enables graph identity analysis, and which identifies specific risks and threats not detected by unauthenticated generic scanning, enabling infection-less determination that a threat exists. Referring to FIG. 14 for example, malicious network locations 1244 linked to the particular network location 1232 corresponding to polymersbank.com are determined.

The security manager 20 for example in the form of a zone protection cloud instance 320 updates IOCs in the intelligence datastore 24, for example in a report archive 736, which enables a threat response 280. The zone protection cloud instance 320 further updates mitigation IOCs for the browser 50, for example stored in a local datastore 54 of the computing device 12 executing the browser 50, enabling the browser 50 to implement threat mitigation on the computing device 12. The zone protection cloud instance 320 beneficially sends an updated block list of threatening sites, for example including the polymersbank.com site and linked threatening sites, to the browser 50 on a user's computing device 12 which can be stored locally on a local datastore 54 of the user's computing device 12. Alternatively, the zone protection cloud instance 320 can send an updated block list of threatening sites to endpoints 312, desktops 314 and other devices and networks 316 or to network security applications provided by a network service provider and enabled by the endpoints 312, desktops 314 and other devices and networks 316.

An updated block list includes one or more threatening sites (e.g., polymersbank.com) and corresponding active indicators including IP addresses which is sent to the browser 50 or other security application or extension (e.g., security agent 16) periodically (e.g., every 15 minutes). The threat response 280 initiates protection before any phishing or user data theft attempt occurs, preventing infections, for example, generating an alert or restricting access to a flagged site, for instance the polymersbank.com site, when a user attempts to follow a link to the site. The zone protection cloud instance 320 beneficially continuously scans, monitoring a flagged site for any exploits and further activity that may impact a user of the browser 50 or endpoints 312, desktops 314, or other devices or networks 316 serviced by a network service provider 330. Analysis is continually performed by the pre-attack analyzer 260 of the intelligence engine 22 to look for changes to the IP addresses (i.e., movement), site takedowns, changes to content, and similarities across other sites. From the continual analysis comprehensive ongoing monitoring and ongoing updates to mitigation IOCs (cleanups/updates) is enabled. Referring to FIG. 14 for example, another malicious network location 1254 is determined based on the ongoing monitoring. The network location 1254 is linked to the particular network location 1232 which corresponds to polymersbank.com.

The zone protection cloud instance 320 further enables continuous analysis of vulnerable sites, for example sites including an exploitable vulnerability. The intelligence data feeds 702 provide a list of certificate updates on each domain in a particular protection zone. The intelligence data and cross-correlation of intelligence data against protection zones can result in a candidate list of potentially vulnerable sites for further inspection. The zone protection cloud instance 320 via the pre-attack analyzer 260 scans surface, content and connectedness of candidate sites. Implementing a generic unauthenticated analysis, a full attack surface assessment is performed for a candidate site including an assessment of the domain, site vulnerabilities, WHOIS records, passive DNS history, certificates, cookies, content downloaded from site, privacy settings, and how data is used by the site. A comprehensive assessment is generated across threats that can attack a user's computing device and compromise a user's data.

The zone protection cloud instance 320 via the pre-attack analyzer 260 scans a candidate vulnerable site in an authenticated mode to scan for cookies, certificates, and SSL settings. Graph identity analysis is performed which identifies specific risks and threats not previously detected by unauthenticated generic scanning. Infection-less determination of a threat is enabled. For example, a misconfigured certificate can be discovered for an assigned domain.

The zone protection cloud instance 320 further enables continuous mitigation concerning vulnerable sites, for example sites including an exploitable vulnerability. The security manager 20 for example in the form of the zone protection cloud instance 320 updates mitigation alerts in the intelligence datastore 24, for example in a report archive 736, which enables a threat response 280. The zone protection cloud instance 320 further updates mitigation alerts for the browser 50, for example stored in a local datastore 54 of the computing device 12 executing the browser 50. The zone protection cloud instance 320 beneficially sends an updated alert list of vulnerable sites to the browser 50 on a user's computing device 12 which can be stored locally on the local datastore 54 of the user's computing device 12. Alternatively, the zone protection cloud instance 320 can send an updated alert list of vulnerable sites to endpoints 312, desktops 314 and other devices and networks 316 or to network security applications provided by a network service provider and enabled by the endpoints 312, desktops 314 or other devices or networks 316. An updated alert list includes one or more vulnerable sites and corresponding active indicators including IP addresses which is sent to the browser 50 or other security application or extension (e.g., security agent 16) periodically (e.g., every 15 minutes). This allows for user awareness before any vulnerability on a vulnerable site is exploited by an actor.

The zone protection cloud instance 320 via the pre-attack analyzer 260 scans and monitors vulnerable sites for exploits and further activity that may affect a user of the browser 50. Analysis is continually performed against each vulnerable site by the pre-attack analyzer 260 of the intelligence engine 22 to look for changes to the IP addresses (i.e., movement), site takedowns, changes to content, and similarities across other sites. Comprehensive ongoing monitoring enables ongoing updates to mitigations (cleanups/updates).

A primary benefit of the system 10 enabled by the zone protection cloud instance 320 is that use of the browser 50 is not slowed down or impacted by analysis and mitigation processes within the auto learning process 500, the layered analytics process 600, and the zone protection process 700 which run in parallel and out-of-band to the browser 50 or other security application enabled endpoint (e.g., the endpoints 312) and provide continuous assessment and mitigation updates to the browser 50 or other security application enabled endpoint. Decision making required of the browser 50 may be accelerated due to previously performed analysis on sites defined by an established protection zone. Analysis and mitigation processes described herein do not require identity information of a user of the browser 50. However, if a user ID or synthetic ID is shared by the user or authorized by the user for use by the intelligence engine 22 (e.g., via the browser 50), then the pre-attack analyzer 260 can assess site content as the provided user ID or synthetic ID instead of performing generic analysis with a generic ID or without an ID. The analysis and mitigation processes do not require any user personally identifiable information ("PII") data to be shared with the security manager 20, the zone protection cloud instance 320, or other network components. The analysis and mitigation processes run on network situated systems and PII resides within a local datastore 54 within the computing device 12 in which the browser 50 and security agent 16 are provisioned. Alternatively, PII resides on other protected user-controlled datastore.

Benefits for a user of the browser 50 include profile-based user-specific security, increased protection against internet threats, automated alerting and security threat mitigation, a user's PII not shared without user authorization, continuous protection against threats, privacy risk protection, and optional sharing of user identity information to permit site analysis using user identity or synthetic identity. Benefits for a network service provider or other network enabling entity of implementing a zone protection cloud instance 320 are profile-based customizable security, increased protection against internet, third-party, and internet of things ("IoT") threats, automated alerting and mitigation with extended detection and response ("XDR"), an end user's PII not shared, continuous protection against threats for end users, integration with network service provider's systems, privacy risk protection for end users, optional sharing of user identity information of end users to permit a site to be analyzed with user identity or synthetic identity.

Not all sites are what they appear to be. A main issue is phishing, but other fake content is pervasive on the internet. The security manager 20 via the zone protection cloud instance 320 is configured to verify that a particular site is in a particular protection zone and is actually operated by the business the site appears to represent. For example, a Bank of America™ branded site can be verified to be actually associated with the legitimate Bank of America™ company, or an Amazon™ branded site is verified to be associated with the legitimate Amazon™ company. The determination is based on data asserted from intelligence sources and analysis performed by the intelligence engine 22 to provide an assessment of the legitimacy of a particular site and its risk. A confidence of the verification is determined which can be provided to a user of a computing device 12 via the user interface 58.

A second exemplary circumstance showing the implementation of the systems described herein is explained with reference to FIGS. 4B and 11-14. In the second exemplary circumstance, a particular user registers with a zone protection service of an internet service provider enabled by the zone protection cloud instance 320 and managed by the internet service provider via the network service provider management portal 370 and provider module 368. The zone protection service includes a protection zone for a financial category and a protection zone for a news category. Protection zones can be predefined based on established sites that the internet service provider has chosen for all registrants of the zone protection service. Alternatively, protection zones can be created automatically based on the DNS history of the particular user.

The zone protection service is deployed in a zone protection cloud instance 320 accessible to the network service provider and including the provider module 368. The zone protection cloud instance 320 monitors the particular user's protection zones for sites, content of the sites, and changes to the sites (e.g., links or references to other sites and to other content). The zone protection cloud instance 320 monitors intelligence and based on algorithmic analysis detects new sites corresponding to the established protection zones that appear on the internet that may be used to threaten the particular user.

In the second imagined exemplary circumstance the new site polymersbank.com is registered and activated. The zone protection cloud instance 320 via the intelligence engine 22 receives the registration in a new domain feed and receives the activation information (e.g., pDNS data, WHOIS data) via threat intelligence, for example intelligence data feeds 702. The domain (polymersbank.com) matches a protection zone (e.g., financial category), which triggers an in-depth scanning and in-depth analysis 396 on the site content, structure, and ownership of polymersbank.com before the particular user becomes aware of the new site. Based on the in-depth analysis 396, it is determined that the site (polymersbank.com) is malicious, and the site and any connections tied to the site are added to an alert list.

An alert is sent via a management and alerts process 394 by the zone protection cloud instance 320 to a protection dashboard 384 enabled via the network service provider management portal 370 accessible to an administrative user of the service provider, and further accessible to the particular user via an endpoint 312 or desktop 314 of the particular user. The particular user receives the alert based on notification settings chosen by the particular user or for the particular user in the protection dashboard 384. The particular user reviews the alert in the protection dashboard 384. The particular user is enabled to select to block the new site automatically via the protection dashboard 384, and the particular user updates their settings to block the new site via the protection dashboard 384, which changes are propagated via a management and alerts process 394 to the provider module 368. The particular user can choose to have mitigation integrated with the network service provider's endpoint and network security applications so the particular user and others sharing the particular user's local area networks and mobile service plans receive protection against malicious sites, for example polymersbank.com. Mitigation updates 398 are propagated to endpoints 312, desktops 314 and other devices with the networks 316. Subsequently received emails, attempted web access, and other performed network activities by the particular user and others (e.g., family members) sharing a user environment 302 (e.g., a network service provider service plan) are protected and secured based on mitigation updates.

Figure 15:
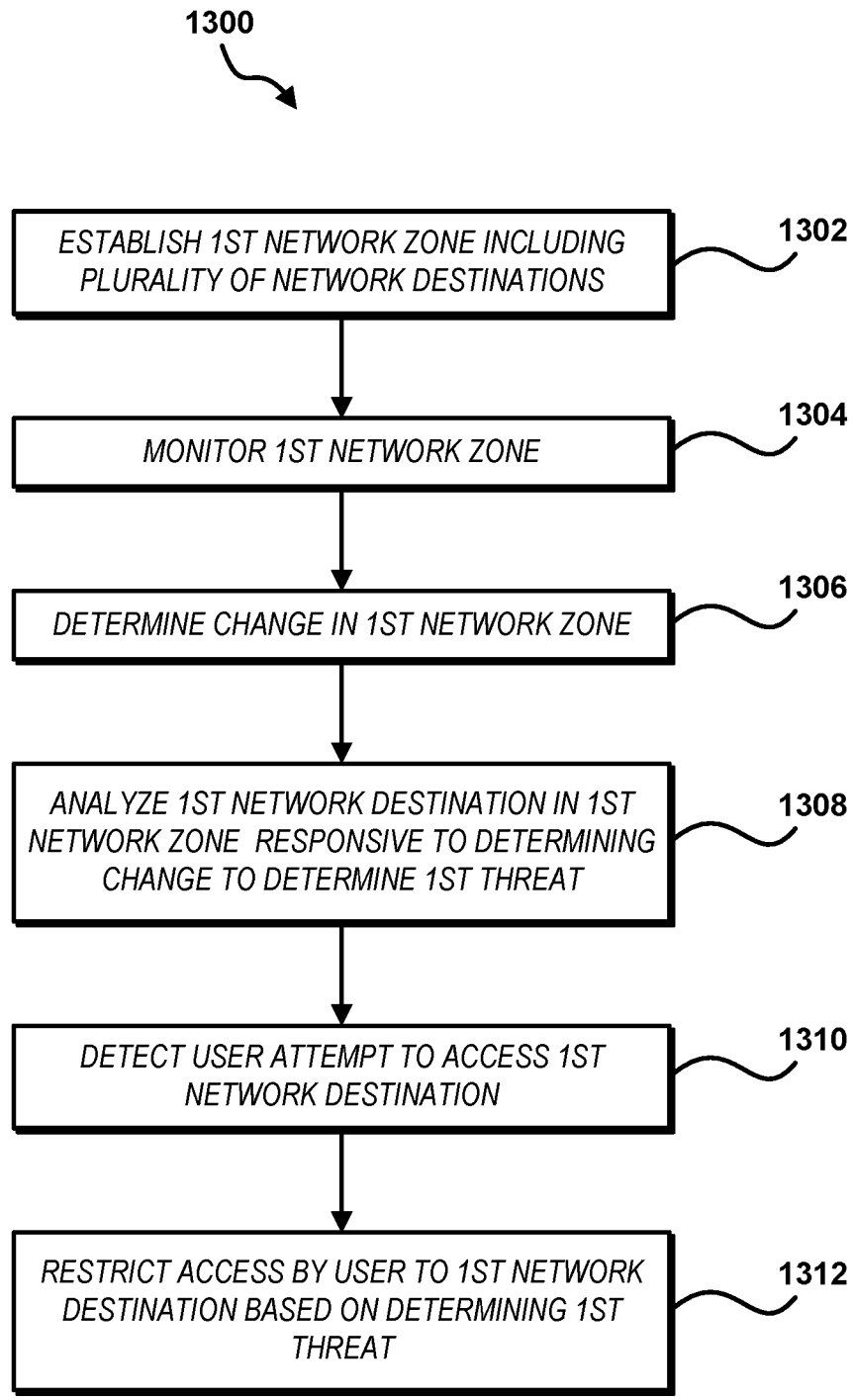
FIGS. 15-18 are diagrams showing methods of managing access to a network destination according to illustrative embodiments.

Referring to FIG. 15, a method 1300 of managing access to a network destination, for example a network destination in the internet, is shown. The method 1300 is described with reference to the components of the system 10, the browser-enabled zone protection environment 300, the network service provider enabled zone protection environment 350, the browser connection configuration 400, and the first and second first exemplary architectures 800, 900 as described herein. Alternatively, the method 1300 can be performed via other systems and is not restricted to being implemented by the so described components.

In a step 1302, a first network zone is established for a user, the first network zone including a plurality of network destinations. The first network zone is monitored (step 1304), and one or more changes in the first network zone is determined (step 1306). A first network destination in the first network zone is analyzed responsive to determining the one or more changes in the first network zone to determine a first threat (step 1308). An attempt by the user to access the first network destination is detected (step 1310), and access by the user to the first network destination is restricted based on the determining the first threat (step 1312).

Detecting the attempt by the user to access the first network destination in step 1310 can include detecting an attempt by the user to access a website or content of a website via a browser on a user device, for example the browser 50 on the computing device 12. As described herein a "user device" is a network connectable computing device. Restricting access by the user to the first network destination can include initiating a blocking interstitial in the browser responsive to the attempt by the user to access the website or content of the website, for example via the blocking action of step 674. Alternatively, detecting the attempt by the user to access the first network destination can include detecting an attempt by the user to download a file via a website via a browser on a user device, and restricting access by the user to the first network destination can include one or both of blocking the download in the browser responsive to the attempt by the user to download the file or blocking access to the file after the file is downloaded to the user device, for example via the blocking action of step 674.

The first network zone established via step 1302 can be established for a plurality of users (i.e., a group of users). For example, identifying information of a plurality of users can be received, the identifying information of the plurality of users can be compared to determine a common profile of the plurality of users, and the first network zone can be established based on the common profile of the plurality of users. The identifying information can include for example one or more of user geographic location information, user business field information, user age information, or user income information. An attempt by each of the plurality of users to access the first network zone can be detected via step 1310, and access by each of the plurality of users can be restricted based on the determining the first threat via step 1312.

Network browsing of the user on a user device can be monitored and the first network zone for the user can be established in step 1302 based on the network browsing of the user. Monitoring the network browsing history of the user can include accessing a network browsing history of the user, wherein establishing the first network zone for the user is based on the network browsing history of the user. More particularly, a hub can be enabled in a browser executed on a user device operated by the user, for example the browser antivirus hub 420 in the browser 50 on a computing device 12. The hub can include one or more connectors to one or more security applications, for example the connectors 430 as connected to the URL scanner 442 and the antivirus applications 452, 454, 456, 458. Access by the user to a website can be detected via the hub, and the one or more security applications can be executed via the one or more connectors. One or more of a universal resource locator ("URL") of the website, content of the website, scripts of the website, or a downloaded file from the website are scanned using the one or more security applications to detect one or both of malicious activity or phishing activity, for example via one or more of the URL scanning hook 412, download scanning hook 414, content scanning hook 416, or script scanning hook 418. The first network zone can be established in step 1302 based on the one or more of the URL of the website, the content of the website, the scripts of the website, or the downloaded file from the website and based on the detecting of one or both of the malicious activity or the phishing activity, for example as described with reference to steps 506, 514, 516, 624, 638, and 656 of FIGS. 6 and 7. Further, detecting the attempt by the user to access the first network destination in step 1310 can include detecting an attempt by the user to access the website via the browser on the user device, and restricting access by the user to the first network destination can include initiating a blocking interstitial in the browser responsive to the attempt by the user to access the website, for example via the blocking action of step 674 of FIG. 7.

Network browsing of one or more other users on one or more other user devices can be monitored, and the first network zone for the user can be established in step 1302 based on the network browsing of the one or more other users. More particularly, a hub can be enabled in a browser executed on a first user device operated by the user and the hub can be enabled in a browser executed on one or more other user devices operated by one or more other parties, for example the browser antivirus hub 420 in the browser 50 on the computing device 12. The hub can include one or more connectors to one or more security applications, for example the connectors 430 as connected to URL scanner 442 and antivirus applications 452, 454, 456, 458. Access by the one or more other parties to a website is detected via the hub in the browser executed on the one or more other user devices. The one or more security applications are executed via the one or more connectors via the browser executed on the one or more other user devices. Using the one or more security applications via the browser executed on the one or more other user devices, one or more of a universal resource locator ("URL") of the website, content of the website, scripts of the website, or a downloaded file from the website are scanned to detect one or both of malicious activity or phishing activity, for example via one or more of the URL scanning hook 412, download scanning hook 414, content scanning hook 416, or script scanning hook 418. The first network zone can be established in step 1302 based on the one or more of the URL of the website, the content of the website, the scripts of the website, or the downloaded file from the website and based on the detecting of the one or both of the malicious activity or the phishing activity, for example as described with reference to steps 506, 514, 516, 624, 638, and 656 of FIGS. 6 and 7. Further, detecting the attempt by the user to access the first network destination in step 1310 can include detecting an attempt by the user to access the website via the browser executed on the first user device, for example the browser 50 executed on the computing device 12, and restricting access by the user to the first network destination can include initiating a blocking interstitial in the browser executed on the first user device via the hub in the browser executed on the first user device responsive to the attempt by the user to access the website, for example via the blocking action of step 674 of FIG. 7.

The analyzing the first network destination in the first network zone (step 1308) is beneficially performed by a first processing component in a network, for example including a cloud-based processing system such as the zone protection cloud instance 320, and the first threat is communicated by the first processing component to a second processing component in the network. The detecting the attempt by the user to access the first network destination (step 1310), and the restricting the access by the user to the first network destination (step 1312) are beneficially performed by the second processing component, the second processing component including one or more of a network browser (e.g., the browser 50 executed on the computing device 12), antivirus application (e.g., applications 452, 454, 456, 458), or a network security device. Intelligence concerning the first network destination can be accessed via a network, and the first threat can be determined based on the intelligence.

The plurality of network destinations of step 1302 can correspond to a plurality of domains, and determining the one or more changes in the first network zone (step 1306) can include detecting one or both of a registration of a particular domain or an activation of the particular domain. The particular domain can be compared to the plurality of domains, and the one or more changes in the first network zone can be determined based on the comparing of the particular domain to the plurality of domains. In a particular embodiment, a matching arrangement of characters in the particular domain and one or more of the plurality of domains can be determined, and the one or more changes in the first network zone can be determined based on the determining the matching arrangement of characters in the particular domain and the one or more of the plurality of domains. For example, a newly activated domain "polymersbank.com" can be determined as matching existing domain "polymerbank.com", one of the plurality of domains in the first network zone, based on matching character arrangements "polymer" and "bank" in the existing and newly activated domains.

The plurality of network destinations can include the first network destination, and determining the one or more changes in the first network zone in step 1306 can include detecting one or both of a new network connection or a modified network connection of the first network destination. For example, the first network destination can correspond to a particular domain name that corresponds to a particular internet protocol ("IP") address, and detecting the one or both of the new network connection or the modified network connection of the first network destination can include determining a change in the particular IP address corresponding to the particular domain name. Further, the first network destination can include a website, and detecting the one or both of the new network connection or the modified network connection of the first network destination can include detecting a link on the website to another network destination.

The first network destination of step 1308 can include one or both of a website or a service, and analyzing the first network destination (step 1308) can include analyzing content of the one or both of the website or the service. Content of the first network destination can be compared to content of the plurality of network destinations to determine the one or more changes in the first network zone in step 1306. Further, the first network destination can include a network connection to a second network destination, and the method 1300 can further include analyzing the second network destination responsive to determining the one or more changes in the first network zone to determine the first threat.

The first network destination can be accessed via synthetic identification credentials to analyze the first network destination to determine the first threat in step 1308. For example, credentials of the user can be received, a permission from the user to use the credentials of the user can be received, and the first network destination can be accessed via the credentials of the user to analyze the first network destination to determine the first threat.

The first network destination of step 1308 can correspond to an internet domain. A passive domain name system ("DNS") history of the internet domain can be accessed via a network, and the first threat can be determined based on the passive DNS history. Further, a WHOIS query can be transmitted via the network for the internet domain, and a response to the WHOIS query can be received. The first threat can be further based or alternatively based on the response to the WHOIS query.

The first network destination of step 1308 can include a first website, and analyzing the first network destination (step 1308) can include analyzing content of the first website to determine the first threat. The first threat can include a link on the first website. The method 1300 can further include determining a second network destination including a second website connected to the first website via the link on the first website. Content of the second website can be analyzed responsive to determining the first threat to determine a second threat, and access by the user to the first network destination can be further restricted based on the determining the second threat.

The first network destination of step 1308 can include a first service, and analyzing the first network destination (step 1308) can include analyzing content of the first service to determine the first threat. The first threat can include a connection enabled by the first service. The method 1300 can further include determining a second network destination including a second service connected to the first service via the connection. Content of the second service can be analyzed responsive to determining the first threat to determine a second threat, and access by the user to the first network destination can be further restricted based on the determining the second threat.

Analyzing the first network destination (step 1308) can include comparing content of the first network destination with a list of predetermined content, and determining the first threat (step 1308) can include determining that that the content of the first network destination includes a computer virus based on the comparing the content. Further, determining the first threat can include determining that the first network destination hosts a computer virus, distributes the computer virus, or includes a security vulnerability.

The first network destination of step 1308 can include a first network address including content. Analyzing the first network destination (step 1308) can include comparing the first network address of the first network destination with a list of predetermined network addresses, and determining the first threat (step 1308) can include determining based on the comparing the first network address that the content of the first network address of the first network destination corresponds to prior network attacks.

Restricting access to the first network destination (step 1312) can include blocking receipt of particular data from the first network destination. The method 1300 can further include providing an alert to the user regarding the first threat and the restriction, receiving an override instruction from the user, and unblocking receipt of the particular data responsive to the override instruction from the user.

Analyzing the first network destination (step 1308) can include detecting a plurality of connections from the first network destination to a plurality of other network destinations. The method 1300 can further include analyzing the plurality of other network destinations responsive to detecting the plurality of connections to determine a second threat, monitoring periodically the plurality of other network destinations responsive to detecting the second threat to determine a third threat, and further restricting access by the user to the first network destination based on the determining the third threat.

Analyzing the first network destination (step 1308) can include detecting one or more connections from the first network destination to a second network destination. The method can further include establishing a second network zone based on the second network destination, the second network zone including the second network destination and a plurality of other network destinations connected to the second network destination. The second network destination and the plurality of other network destinations can be analyzed to determine a second threat. The second network destination and the plurality of other network destinations can be periodically monitored responsive to detecting the second threat to determine a third threat, and access by the user to the first network destination can be further restricted based on the determining the third threat.

Figure 16:
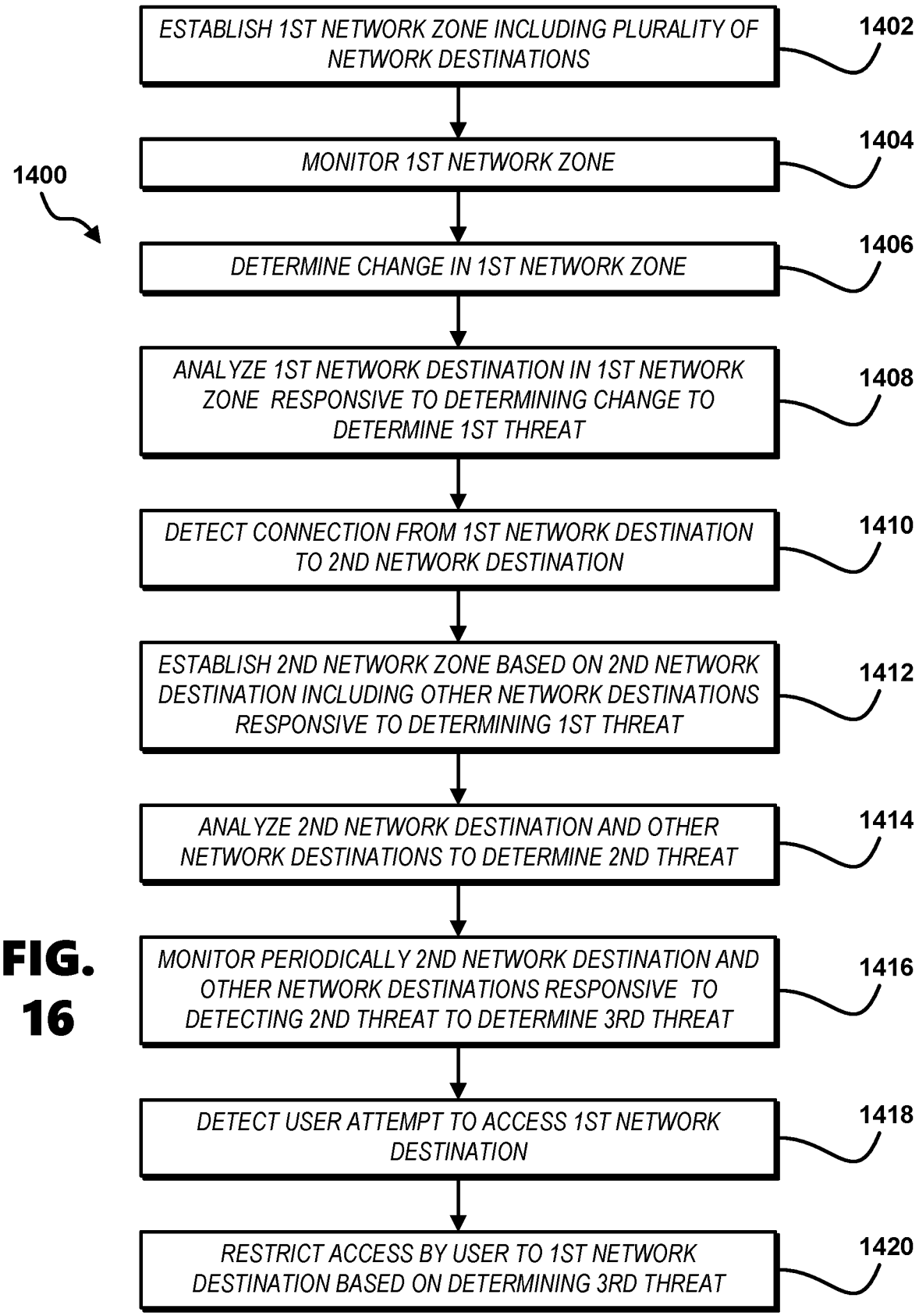

Referring to FIG. 16, a method 1400 of managing access to a network destination is shown. The method 1400 is described with reference to the components of the system 10, the browser-enabled zone protection environment 300, the network service provider enabled zone protection environment 350, the browser connection configuration 400, and the first and second first exemplary architectures 800, 900 described herein. Alternatively, the method 1400 can be performed via other systems and is not restricted to being implemented by the so described components.

In a step 1402, a first network zone is established for a user, the first network zone including a plurality of network destinations. The first network zone is monitored (step 1404). One or more changes in the first network zone are determined (step 1406), and a first network destination in the first network zone is analyzed responsive to determining the one or more changes in the first network zone to determine a first threat (step 1408). One or more connections from the first network destination to a second network destination are detected (step 1410). A second network zone is established based on the second network destination responsive to determining the first threat, the second network zone comprising the second network destination and a plurality of other network destinations connected to the second network destination (step 1412). The second network destination and the plurality of other network destinations are analyzed to determine a second threat (step 1414). The second network destination and the plurality of other network destinations are monitored periodically responsive to detecting the second threat to determine a third threat (step 1416). An attempt by the user to access the first network destination is detected (step 1418), and access by the user to the first network destination is restricted based on the determining the third threat (step 1420).

Figure 17:
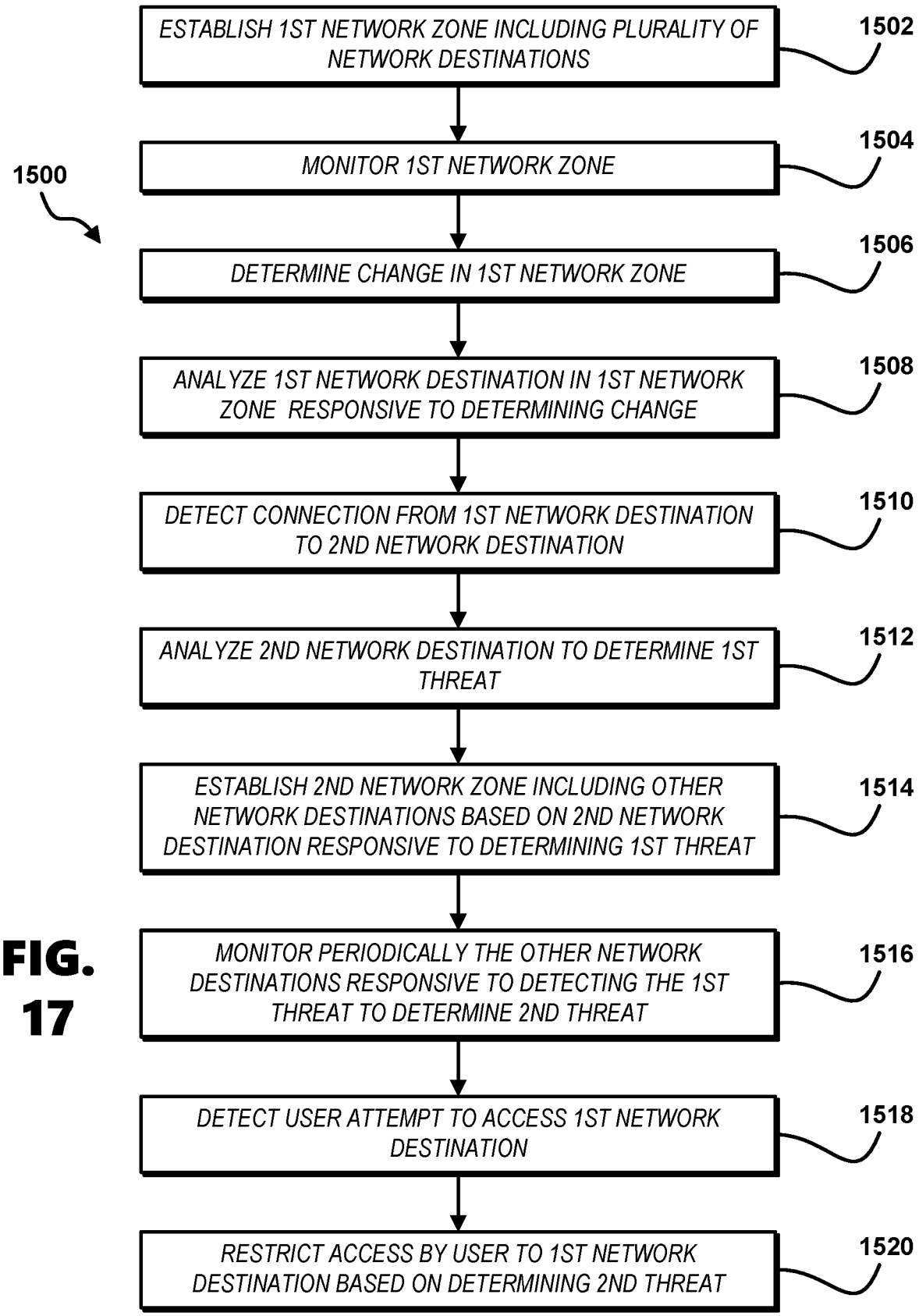

Referring to FIG. 17, a method 1500 of managing access to a network destination is shown. The method 1500 is described with reference to the components of the system 10, the browser-enabled zone protection environment 300, the network service provider enabled zone protection environment 350, the browser connection configuration 400, and the first and second first exemplary architectures 800, 900 described herein. Alternatively, the method 1500 can be performed via other systems and is not restricted to being implemented by the so described components.

In a step 1502, a first network zone is established for a user, the first network zone including a plurality of network destinations. The first network zone is monitored (step 1504). One or more changes in the first network zone are determined (step 1506), and a first network destination in the first network zone is analyzed responsive to determining the one or more changes in the first network zone (step 1508). One or more connections from the first network destination to a second network destination are detected based on the analyzing the first network destination (step 1510), and the second network destination is analyzed to determine a first threat (step 1512). A second network zone is established based on the second network destination responsive to determining the first threat, the second network zone including a plurality of other network destinations connected to the second network destination (step 1514). The plurality of other network destinations are periodically monitored responsive to determining the first threat to determine a second threat (step 1516). An attempt by the user to access the first network destination is detected (step 1518), and access by the user to the first network destination is restricted based on the determining the second threat (step 1520). Determining the first threat can include for example determining that the first network destination hosts a particular computer virus, distributes the particular computer virus, or includes a particular security vulnerability. Determining the second threat can include for example determining that one or more of the plurality of other network destinations hosts an other computer virus, distributes the other computer virus, or includes an other security vulnerability.

Figure 18:
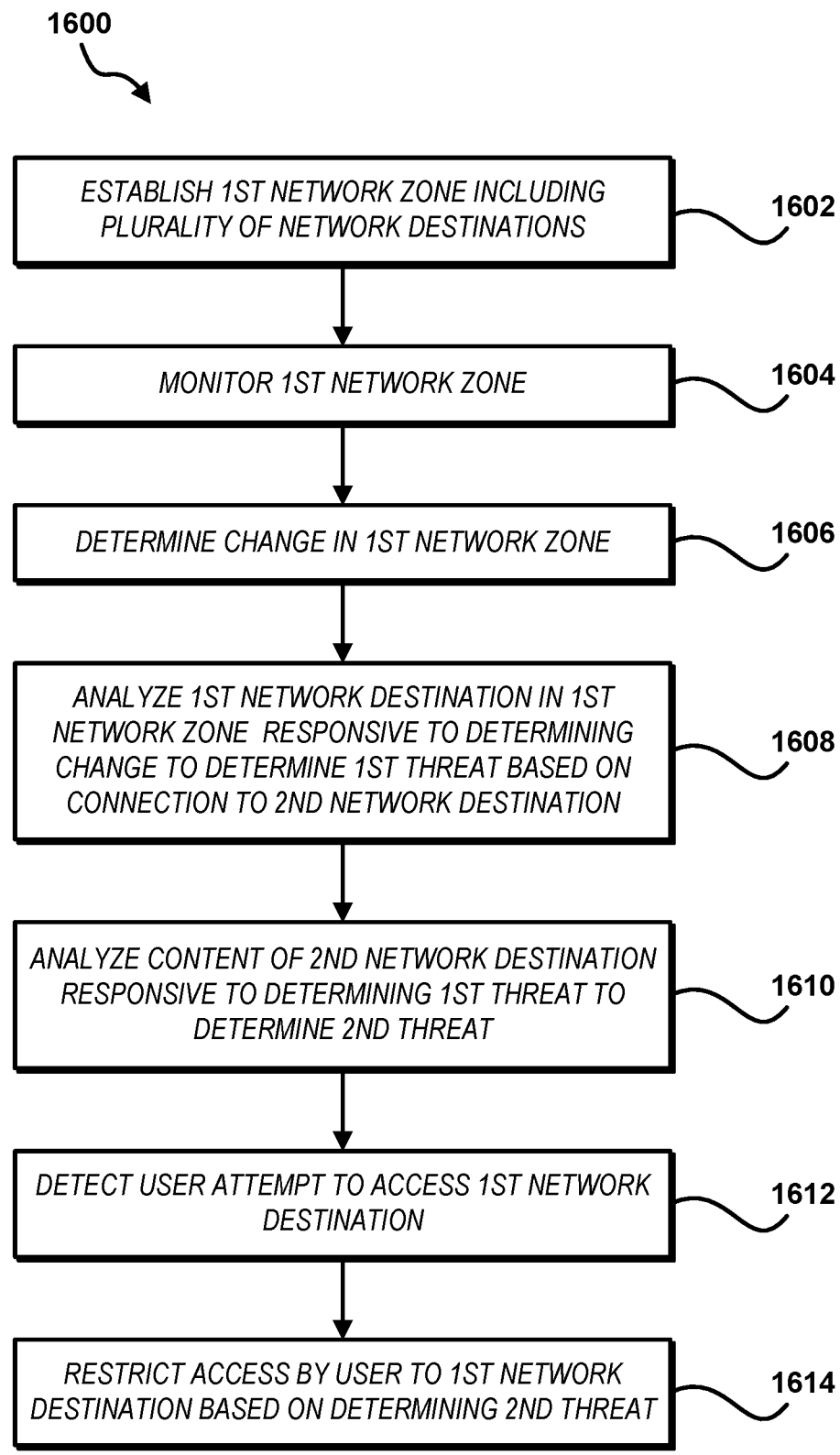

Referring to FIG. 18, a method 1600 of managing access to a network destination is shown. The method 1600 is described with reference to the components of the system 10, the browser-enabled zone protection environment 300, the network service provider enabled zone protection environment 350, the browser connection configuration 400, and the first and second first exemplary architectures 800, 900 described herein. Alternatively, the method 1600 can be performed via other systems and is not restricted to being implemented by the so described components.

In a step 1602, a first network zone is established for a user, the first network zone including a plurality of network destinations. The first network zone is monitored (step 1604), and one or more changes in the first network zone are determined (step 1606). A first network destination in the first network zone is analyzed responsive to determining the one or more changes in the first network zone to determine a first threat based on a network connection from the first network destination to a second network destination (step 1608). Content of the second network destination is analyzed responsive to determining the first threat to determine a second threat (step 1610). For example, the second network destination can be compared with a list of predetermined network destinations to determine the first threat, and the content of the second network destination can be compared with one or more virus definitions to determine the second threat. An attempt by the user to access the first network destination is detected (step 1612), and access by the user to the first network destination is restricted based on the determining the second threat (step 1614).

Figure 19:
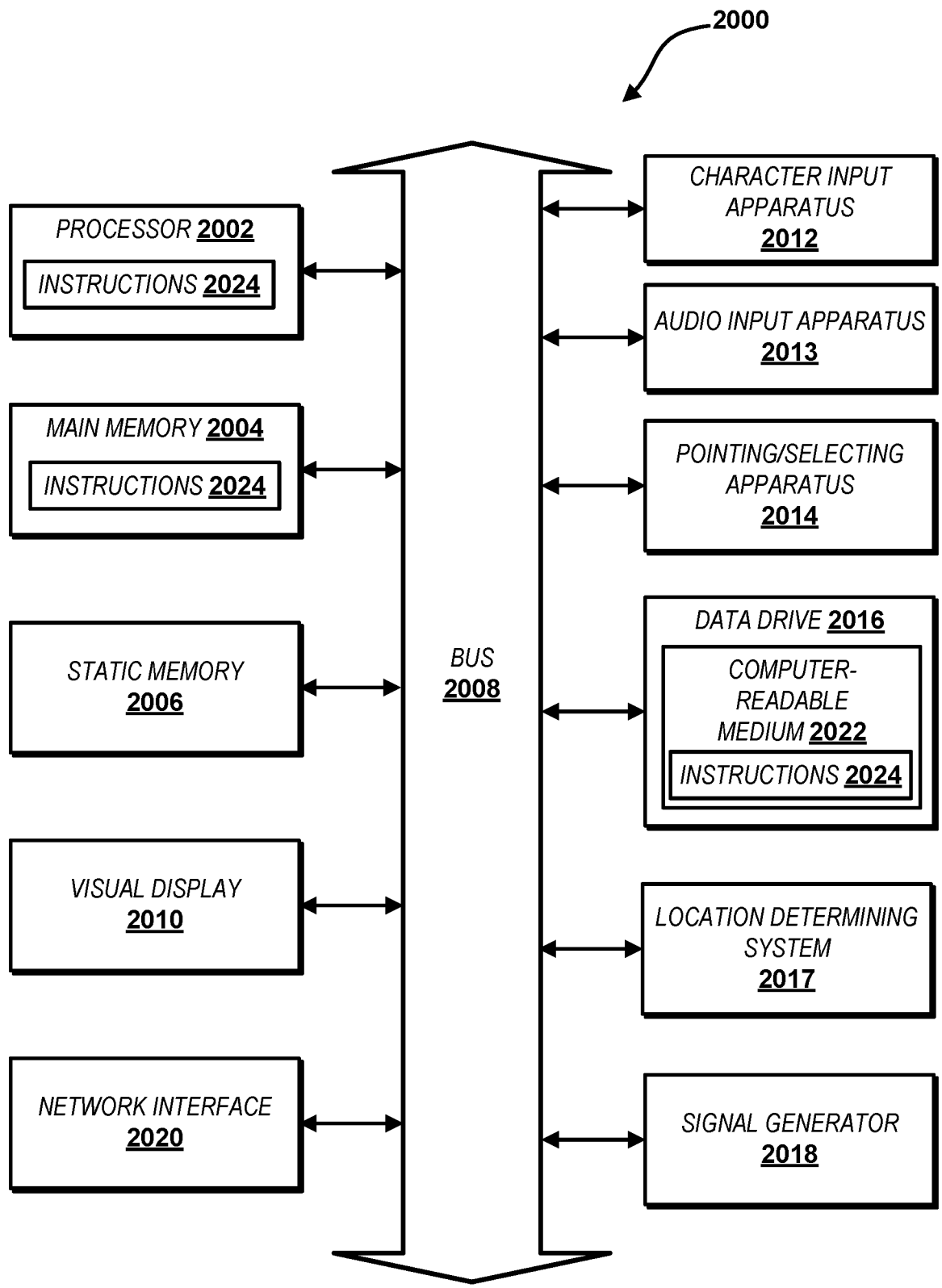
FIG. 19 shows a computer system for performing described methods according to illustrative embodiments.

FIG. 19 illustrates in abstract the function of an exemplary computer system 2000 on which the systems, methods and processes described herein can execute. For example, the computing device 12, security manager 20, and the web/app servers 40 can each be embodied by a particular computer system 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
    enabling a hub in a browser executed on a first user device operated by a first user and enabling a hub in a browser executed on at least one other user device operated by at least one other user, the hub in the browser executed on the at least one other user device comprising at least one connector connected to at least one security application;
    detecting access by the at least one other user to a website via the hub in the browser executed on the at least one other user device;
    executing via the at least one connector the at least one security application via the browser executed on the at least one other user device;
    scanning using the at least one security application via the browser executed on the at least one other user device at least one of a universal resource locator ("URL") of the website, content of the website, scripts of the website, or a downloaded file from the website to detect at least one of malicious activity or phishing activity; and establishing a first network zone for the first user based on the at least one of the URL of the website, the content of the website, the scripts of the website, or the downloaded file from the website and based on the detecting of the at least one of the malicious activity or the phishing activity, the first network zone comprising a plurality of network destinations;

monitoring the first network zone;

determining at least one change in the first network zone;

analyzing a first network destination in the first network zone responsive to determining the at least one change in the first network zone to determine a first threat;

detecting an attempt by the first user to access the first network destination; and restricting access by the first user to the first network destination based on the determining the first threat.

2. The method of claim 1, further comprising:

establishing the first network zone for a plurality of users;

detecting an attempt by each of the plurality of users to access the first network zone; and restricting access by each of the plurality of users to the first network zone based on the determining the first threat.

3. The method of claim 1, further comprising:

receiving identifying information of a plurality of users;

comparing the identifying information of the plurality of users to determine a common profile of the plurality of users;

establishing the first network zone further based on the common profile of the plurality of users;

detecting an attempt by each of the plurality of users to access the first network zone; and restricting access by each of the plurality of users to the first network zone based on the determining the first threat.

4. The method of claim 3, wherein the identifying information comprises at least one of user geographic location information, user business field information, user age information, or user income information.

5. The method of claim 1, further comprising:

monitoring network browsing of the first user on the first user device; and establishing the first network zone for the first user further based on the network browsing of the first user.

6. The method of claim 1, further comprising:

accessing a network browsing history of the first user; and establishing the first network zone for the first user further based on the network browsing history of the first user.

7. The method of claim 1, wherein:

the analyzing the first network destination in the first network zone is performed by a first processing component in a network;

the first threat is communicated by the first processing component to a second processing component in the network; and the detecting the attempt by the first user to access the first network destination, and the restricting the access by the first user to the first network destination are performed by the second processing component, the second processing component comprising at least one of a network browser, antivirus application, or a network security device, wherein the first user device comprises the second processing component.

8. The method of claim 7, wherein the first processing component comprises a cloud-based processing system.

9. The method of claim 1, wherein the plurality of network destinations correspond to a plurality of domains; and the determining the at least one change in the first network zone comprises detecting at least one of a registration of another domain or an activation of the another domain.

10. The method of claim 9, further comprising:

comparing the another domain to the plurality of domains; and determining the at least one change in the first network zone based on the comparing of the another domain to the plurality of domains.

11. The method of claim 10, further comprising:

determining a matching arrangement of characters in the another domain and at least one of the plurality of domains; and determining the at least one change in the first network zone based on the determining the matching arrangement of characters in the another domain and the at least one of the plurality of domains.

12. The method of claim 1, further comprising comparing content of the first network destination to content of the plurality of network destinations to determine the at least one change in the first network zone.

13. The method of claim 1, wherein:

the first network destination comprises at least one of the website or a service; and analyzing the first network destination comprises analyzing content of the at least one of the website or the service.

14. The method of claim 1, wherein the first network destination comprises a network connection to a second network destination, the method further comprising analyzing the second network destination responsive to determining the at least one change in the first network zone to determine the first threat.

15. The method of claim 1, further comprising accessing the first network destination via synthetic identification credentials to analyze the first network destination to determine the first threat.

16. The method of claim 1, further comprising:

receiving credentials of the first user;

receiving a permission from the first user to use the credentials of the first user; and accessing the first network destination via the credentials of the first user to analyze the first network destination to determine the first threat.

17. The method of claim 1, further comprising accessing the first network destination via credentials of the first user to analyze the first network destination to determine the first threat.

18. The method of claim 1, further comprising:

via a network accessing intelligence concerning the first network destination; and determining the first threat based on the intelligence.

19. The method of claim 1, wherein the first network destination corresponds to an internet domain, the method further comprising:

accessing via a network a passive domain name system ("DNS") history of the internet domain; and determining the first threat based on the passive DNS history.

20. The method of claim 19, further comprising:
transmitting a WHOIS query via the network for the internet domain;
receiving a response to the WHOIS query; and
determining the first threat further based on the response to the WHOIS query.

21. The method of claim 1, wherein:
the first network destination comprises the website; and
analyzing the first network destination comprises analyzing content of the website to determine the threat, the first threat comprising a link on the website;
the method further comprising:
determining a second network destination comprising another website connected to the website via the link on the website;
analyzing content of the another website responsive to determining the first threat to determine a second threat; and
restricting access by the first user to the first network destination based on the determining the first threat and the determining the second threat.

22. The method of claim 1, wherein:
the first network destination comprises a first service; and
analyzing the first network destination comprises analyzing content of the first service to determine the first threat, the first threat comprising a connection enabled by the first service; the method further comprising:
determining a second network destination comprising a second service connected to the first service via the connection;
analyzing content of the second service responsive to determining the first threat to determine a second threat; and
restricting access by the first user to the first network destination based on the determining the first threat and the determining the second threat.

23. The method of claim 1, wherein:
analyzing the first network destination comprises comparing content of the first network destination with a list of predetermined content; and
determining the first threat comprises determining that the content of the first network destination comprises a computer virus based on the comparing the content.

24. The method of claim 1, wherein:
the first network destination comprises a first network address comprising content;
analyzing the first network destination comprises comparing the first network address of the first network destination with a list of predetermined network addresses; and
determining the first threat comprises determining based on the comparing the first network address that the content of the first network address of the first network destination corresponds to prior network attacks.

25. The method of claim 1, wherein restricting access to the first network destination comprises blocking receipt of particular data from the first network destination, the method further comprising:
providing an alert to the first user regarding the first threat and the restriction;
receiving an override instruction from the first user; and
unblocking receipt of the particular data responsive to the override instruction from the first user.

26. The method of claim 1, wherein the analyzing the first network destination comprises detecting a plurality of connections from the first network destination to a plurality of other network destinations, the method further comprising:
analyzing the plurality of other network destinations responsive to detecting the plurality of connections to determine a second threat;
monitoring periodically the plurality of other network destinations responsive to determining the second threat to determine a third threat; and
further restricting access by the first user to the first network destination based on the determining the third threat.

27. The method of claim 1, wherein the analyzing the first network destination comprises detecting at least one connection from the first network destination to a second network destination, the method further comprising:
establishing a second network zone based on the second network destination, the second network zone comprising the second network destination and a plurality of other network destinations connected to the second network destination;
analyzing the second network destination and the plurality of other network destinations to determine a second threat;
monitoring periodically the second network destination and the plurality of other network destinations responsive to determining the second threat to determine a third threat; and
further restricting access by the first user to the first network destination based on the determining the third threat.

28. The method of claim 1, wherein:
detecting the attempt by the first user to access the first network destination comprises detecting an attempt by the first user to access the website via the browser executed on the first user device; and
restricting access by the first user to the first network destination comprises initiating a blocking interstitial in the browser executed on the first user device via the hub in the browser executed on the first user device responsive to the attempt by the first user to access the website.

29. The method of claim 1, wherein:
detecting the attempt by the first user to access the first network destination comprises detecting an attempt by the first user to access the website via the browser executed on the first user device; and
restricting access by the first user to the first network destination comprises initiating a blocking interstitial in the browser executed on the first user device responsive to the attempt by the first user to access the website.

30. The method of claim 1, wherein:
detecting the attempt by the first user to access the first network destination comprises detecting an attempt by the first user to access content of the website via the browser executed on the first user device; and
restricting access by the first user to the first network destination comprises initiating a blocking interstitial in the browser responsive to the attempt by the first user to access the content of the website.

31. The method of claim 1, wherein:
detecting the attempt by the first user to access the first network destination comprises detecting an attempt by the first user to download a file via the website via the browser executed on the first user device; and
restricting access by the first user to the first network destination comprises at least one of blocking the download in the browser responsive to the attempt by the first user to download the file or blocking access to the file after the file is downloaded to the first user device.

32. The method of claim 1, wherein determining the first threat comprises determining that the first network destination at least one of hosts a computer virus, distributes the computer virus, or includes a security vulnerability.

33. The method of claim 1, wherein:
the plurality of network destinations comprise the first network destination; and
determining the at least one change in the first network zone comprises detecting at least one of a new network connection or a modified network connection of the first network destination.

34. The method of claim 33, wherein:
the first network destination corresponds to a particular domain name that corresponds to a particular internet protocol ("IP") address; and
detecting the at least one of the new network connection or the modified network connection of the first network destination comprises determining a change in the particular IP address corresponding to the particular domain name.

35. The method of claim 33, wherein:
the first network destination comprises the website; and
detecting the at least one of the new network connection or the modified network connection of the first network destination comprises detecting a link on the website to a second network destination.

36. A computing system comprising at least one hardware processor and at least one non-transitory computer-readable storage medium coupled to the at least one hardware processor and storing programming instructions for execution by the at least one hardware processor, wherein the programming instructions, when executed, cause the computing system to perform operations comprising:

enabling a hub in a browser executed on a first user device operated by a first user and enabling a hub in a browser executed on at least one other user device operated by at least one other user, the hub in the browser executed on the at least one other user device comprising at least one connector connected to at least one security application;
detecting access by the at least one other user to a website via the hub in the browser executed on the at least one other user device;
executing via the at least one connector the at least one security application via the browser executed on the at least one other user device;
scanning using the at least one security application via the browser executed on the at least one other user device at least one of a universal resource locator ("URL") of the website, content of the website, scripts of the website, or a downloaded file from the website to detect at least one of malicious activity or phishing activity; and
establishing a first network zone for the first user based on the at least one of the URL of the website, the content of the website, the scripts of the website, or the downloaded file from the website and based on the detecting of the at least one of the malicious activity or the phishing activity, the first network zone comprising a plurality of network destinations;
monitoring the first network zone;
determining at least one change in the first network zone;
analyzing a first network destination in the first network zone responsive to determining the at least one change in the first network zone to determine a first threat;
detecting an attempt by the first user to access the first network destination; and
restricting access by the first user to the first network destination based on the determining the first threat.

* * * * *

UNITED STATES PATENT AND TRADEMARK OFFICE
CERTIFICATE OF CORRECTION

| | |
|---|---|
| PATENT NO. | : 11,949,693 B2 |
| APPLICATION NO. | : 17/317707 |
| DATED | : April 2, 2024 |
| INVENTOR(S) | : Allan Thomson |

It is certified that error appears in the above-identified patent and that said Letters Patent is hereby corrected as shown below:

In the Claims

In Claim 21, at Column 33, Line 10, before the word "threat" insert --first--.

Signed and Sealed this
Eighteenth Day of June, 2024

Katherine Kelly Vidal
*Director of the United States Patent and Trademark Office*